(12) United States Patent
Thomason et al.

(10) Patent No.: US 12,196,359 B2
(45) Date of Patent: Jan. 14, 2025

(54) TELESCOPING SUPPORT STAND APPARATUS

(71) Applicant: Bushnell Holdings, Inc., Overland Park, KS (US)

(72) Inventors: Jacob R. Thomason, Madison, MS (US); Garrett T. Grey, Brandon, MS (US)

(73) Assignee: Bushnell Holdings, Inc., Overland Park, KS (US)

( * ) Notice: Subject to any disclaimer, the term of this patent is extended or adjusted under 35 U.S.C. 154(b) by 38 days.

(21) Appl. No.: 18/082,419

(22) Filed: Dec. 15, 2022

(65) Prior Publication Data

US 2023/0184372 A1     Jun. 15, 2023

Related U.S. Application Data

(60) Provisional application No. 63/289,989, filed on Dec. 15, 2021, provisional application No. 63/289,917, filed on Dec. 15, 2021.

(51) Int. Cl.
| | |
|---|---|
| *F16M 11/26* | (2006.01) |
| *F16M 11/34* | (2006.01) |
| *F16M 11/14* | (2006.01) |
| *F41A 23/14* | (2006.01) |

(52) U.S. Cl.
CPC ............ *F16M 11/26* (2013.01); *F16M 11/34* (2013.01); *F16M 11/14* (2013.01); *F16M 2200/027* (2013.01); *F41A 23/14* (2013.01)

(58) Field of Classification Search
CPC ........ F16M 11/32; F16M 11/26; F16M 11/34; F16M 11/16; F16M 2200/027; F41A 23/14; F16B 7/1463; F16B 7/1445; F16B 7/14; F16B 7/1418; F16B 7/1427; F16B 7/1454; F16B 7/1409
USPC .............................. 248/157, 168, 412, 188.5
See application file for complete search history.

(56) References Cited

U.S. PATENT DOCUMENTS

| | | | | |
|---|---|---|---|---|
| 2,587,511 A * | 2/1952 | Nerman | ................. | F16M 11/36 248/188 |
| 2,687,866 A * | 8/1954 | Johnson | ..................... | F16B 7/14 248/188.4 |
| 6,574,899 B1 * | 6/2003 | Mostello | ................. | F41A 23/16 42/94 |
| 7,204,466 B2 * | 4/2007 | Hsieh | ................... | F16M 11/242 403/104 |

(Continued)

FOREIGN PATENT DOCUMENTS

| | | |
|---|---|---|
| DE | 1773269 A1 | 6/1971 |
| DE | 4202825 A1 | 8/1993 |

(Continued)

OTHER PUBLICATIONS

International Search Report and Written Opinion mailed Mar. 30, 2023, for related International Application No. PCT/US2022/053072 (16 pages).

(Continued)

*Primary Examiner* — Ingrid M Weinhold
(74) *Attorney, Agent, or Firm* — Reed Smith LLP; Walter M. Egbert, III; Richard J. Brown

(57) ABSTRACT

A telescoping support stand comprising handle mounted below a connection housing and a plurality of extendable legs pivotably engaged near the top of the connection housing.

19 Claims, 39 Drawing Sheets

(56) References Cited

U.S. PATENT DOCUMENTS

| | | | | |
|---|---|---|---|---|
| 7,296,909 | B2* | 11/2007 | Van Deursen | F16M 13/04 |
| | | | | 362/208 |
| 7,302,745 | B2* | 12/2007 | Stahle | A47L 9/244 |
| | | | | 403/374.1 |
| 7,506,846 | B2* | 3/2009 | Speggiorin | F16B 7/1409 |
| | | | | 248/157 |
| 7,845,602 | B1 | 12/2010 | Young et al. | |
| 8,146,876 | B1 | 4/2012 | Young et al. | |
| 8,256,732 | B1 | 9/2012 | Young et al. | |
| 8,376,646 | B2* | 2/2013 | Melino, Sr. | F16B 7/1454 |
| | | | | 403/322.4 |
| 8,469,326 | B1 | 6/2013 | Young et al. | |
| 8,714,508 | B1 | 5/2014 | Young et al. | |
| 9,010,710 | B1 | 4/2015 | Young et al. | |
| 9,568,143 | B2* | 2/2017 | Ben Meir | F16M 11/34 |
| 10,724,681 | B2 | 7/2020 | Gearing et al. | |
| 10,808,880 | B1 | 10/2020 | Gearing | |
| 11,339,916 | B2* | 5/2022 | Smith | F16M 11/10 |
| 11,953,145 | B2* | 4/2024 | Zahariev | F16B 7/1463 |
| 11,976,778 | B2* | 5/2024 | Grey | F16M 11/14 |
| 2003/0136885 | A1* | 7/2003 | Malizia | F16M 11/046 |
| | | | | 248/188.5 |
| 2005/0186028 | A1* | 8/2005 | Stahle | F16B 7/1418 |
| | | | | 403/377 |
| 2010/0243828 | A1* | 9/2010 | Lippert | F16M 11/2014 |
| | | | | 248/157 |
| 2021/0123561 | A1* | 4/2021 | Smith | F16M 11/2078 |
| 2021/0180742 | A1* | 6/2021 | Steere | F16M 11/34 |
| 2021/0190261 | A1 | 6/2021 | Warner | |
| 2021/0278161 | A1 | 9/2021 | Gearing | |
| 2023/0020970 | A1* | 1/2023 | Zahariev | F16M 11/16 |
| 2023/0184371 | A1* | 6/2023 | Grey | F16M 11/04 |
| | | | | 248/188.5 |

FOREIGN PATENT DOCUMENTS

| | | |
|---|---|---|
| EP | 3311061 B1 | 4/2018 |
| EP | 2880352 B1 | 9/2020 |
| WO | 2011026444 A1 | 3/2011 |
| WO | 2013133461 A1 | 9/2013 |

OTHER PUBLICATIONS

International Search Report and Written Opinion mailed Apr. 3, 2023, for related International Application No. PCT/US2022/052981 (16 pages).

* cited by examiner

TELESCOPING SUPPORT STAND APPARATUS

CROSS REFERENCE TO RELATED APPLICATIONS

This application claims priority to U.S. Provisional Patent Application Ser. No. 63/289,989, filed Dec. 15, 2021, and U.S. Provisional Patent Application Ser. No. 63/289,917, filed Dec. 15, 2021, each of which is incorporated by reference in its entirety herein.

FIELD OF THE DISCLOSED SUBJECT MATTER

The present invention relates to a telescoping support stand having a handle and trigger operably connected to a releasable locking mechanism to allow quick deployment of the stand.

BACKGROUND OF THE DISCLOSED SUBJECT MATTER

Support stands, such as microphone stands and shooting stands, often include telescoping tubes that allow the height of the stands to be adjusted. These telescoping stands may have an inner tube, an outer tube, and a lock that keeps the inner tube from sliding relative to the outer tube. Such stands may be used in situations that require the stands to be rugged and capable of withstanding the elements. For example, hunter's shooting stands, microphone stands, telescope stands, and camera stands are often used outdoors. The components of a stand intended for outdoor use may need to be sealed and tightly fitted to keep water, dirt, and other debris from getting inside the tubes of the stand.

A user may adjust the height of a telescoping support stand by releasing the lock and moving the inner tube up and down within the outer tube. The lock may be a collar that is rotatable to compress the inner tube and the outer tube, binding them at a set length. The lock may also be a set screw bolt that passes through the outer tube and presses against the inner tube. The lock may be a lever lock that tightens the outer tube around the inner tube. One problem with these types of locks is the time it takes for a user to manipulate the lock when making a height adjustment to the stand. Another problem with these locks is that the user may have to hold the inner tube in position while fastening the lock, thus requiring the use of two hands.

Some support stands are equipped with an external trigger connected to an internal lock that secures the inner tube to the outer tube. This locking configuration may allow a user to make quick height adjustments and may permit the user to make adjustments using only one hand. For additional convenience and adjustment speed, the external trigger may be placed on a handle attached to the top of the inner tube. While there are many benefits to a quick-adjustment configuration that utilizes an internal locking mechanism and a handle trigger, there are numerous problems associated with such a support stand configuration.

For example, a user may inadvertently pull the trigger while gripping the handle. For example, a hunter targeting a moving elk may keep one hand on the handle of a shooting stand to be ready to make height adjustments. However, in the excitement of taking a shot at the elk, with the weight of a gun resting on the shooting stand, the hunter may accidentally activate the trigger on the stand, which would drop the height of the stand as he shoots. This situation is dangerous and could result in an inaccurate shot.

Another problem with the quick-adjustment stand configuration is that an internal lock may restrict the flow of air between the inner and outer tubes. The internal lock may be sized to fit snugly within the inner tube and press securely against the outer tube, which closes off the air passageway between the inner and outer tubes. Furthermore, as previously mentioned, support stands are often manufactured to keep water and other debris out, which prevents air from freely flowing in and out of the stand. Thus, air cannot easily flow into, out of, or between the tubes of rugged support stands with internal locks.

When air is unable to quickly enter, exit, or flow between the tubes of a support stand, it is more difficult to make rapid height adjustments to the stand. For example, when a user attempts to extend the length of the stand, the volume inside the outer tube expands, but air is not able to rapidly enter the outer tube and fill the new volume. This vacuum effect creates resistance against a user's attempt to increase the height of the stand. Conversely, when a user attempts to shorten the stand, the volume inside the outer tube decreases. A dampening effect results when air is not able to quickly exit the outer tube. This dampening effect creates resistance against a user's attempt to shorten the stand.

When the airflow within a stand is restricted, a user may need to use two hands to overcome the vacuum and dampening effects to adjust the height of the stand. For example, users may hold the inner tube with one hand while pulling down on the outer tube with the other hand. Users may also hold the outer tube between their feet while pulling up on the inner tube. This situation is undesirable when the user needs to make a quick adjustment or does not have a free hand to help make the adjustment.

It is desirable to develop improved telescoping stands that solve one or more of these problems.

SUMMARY OF THE DISCLOSED SUBJECT MATTER

Disclosed herein is a telescoping support stand comprising a handle mounted below a connection housing and a plurality of extendable legs pivotably engaged near the top of the connection housing. The stand comprises a trigger disposed in the handle to actuate a release assembly within the housing to release a locking mechanism within the extendable legs to allow an inner tube and an outer tube to move longitudinally relative to each other when the release assembly is activated.

A first aspect provides a telescoping support stand comprising: a handle comprising a trigger disposed within the handle, wherein the handle is attached to a bottom end of a connection housing, when the telescoping support stand is in normal use; the connection housing comprises a plurality of pivot hubs and a release assembly within the connection housing configured to be actuated by the trigger; a plurality of extendable legs pivotably engaged to the plurality of pivot hubs near the top of the connection housing, each extendable leg comprising an outer tube; an inner tube having a first end portion that telescopically slides within the outer tube and a second end portion and a second end pivotably connected to the connection housing; a locking mechanism mounted to the first end portion of inner tube; wherein actuation of the trigger actuates the release mechanism to release the locking mechanism within each of the plurality of extendable legs to allow the inner tube and the outer tube to move longitudinally relative to each other when the release assembly is activated; wherein when the trigger is in a first position, the release assembly in communication with the locking mechanism prevents longitudinal movement of inner tube and outer tube relative to each other; and when the trigger is in a second position, the release assembly in communication with the locking mechanism allows longitudinal movement of inner tube and outer tube relative to each other.

Embodiments of the stand include the following, alone or in any combination.

The release assembly comprises a displacement rod extending from the connection housing into the handle in operational connectivity to the trigger and the release member in the connection housing; wherein the release member is in operational connectivity to a plurality of release levers within the plurality of pivot hubs in the connection housing; the plurality of release levers are in operational connectivity with a plurality of release rods, wherein each release lever is pivotable about a pivot and each of the plurality of release rods is in operational connectivity to a respective locking mechanism within each of the extendable legs; and the trigger comprises a curved portion at its upper end engaged to a wheel disposed to the bottom end of the displacement rod is configured to move displacement rod upward when the trigger is moved radially inward toward the handle.

The locking mechanism comprises a plunger operationally connected to each release rod, a collar attached to the bottom of the inner tube and slidably engaged around the plunger; a helical spring disposed around the plunger and engaged at its upper end to the upper end of the plunger and its lower end engaged to the collar, a truncated cone member disposed around the plunger; a bearing retainer comprising a plurality of bearings circumferentially disposed around the bearing retainer; wherein the conical surface of the truncated cone member is configured to contact the plurality of bearings; wherein the locking mechanism is configured to move between a first position preventing the inner tube and the outer tube from moving relative to each other and a second position wherein the inner tube and the outer tube are allowed to move relative to each other.

In the first position, the trigger is disposed radially outward from the handle assembly, the conical surface of the truncated cone member is in contact with the plurality of bearings, pressing them against an inner surface of the outer tube and preventing the inner tube and the outer tube from moving relative to each other; and in the second position, the trigger is disposed radially inward toward the handle assembly, the conical surface of the truncated cone member allows the bearings to move out of contact with the inner surface, allowing the inner tube and the outer tube to move relative to each other.

Each extendable leg comprises a pivot lock configured to engage one or more detents in the connection housing to independently define the amount of pivotable adjustment with respect to the handle, connection housing or with respect to each other.

Each leg further comprises an open end cap disposed on a first end of the outer tube around the second tube comprising an extension lock configured to prevent and/or allow longitudinal movement of the inner tube within the outer tube.

Each leg further comprises a third or outermost tube comprising an open end cap disposed on a first end of the third tube around the outer tube comprising an extension lock configured to prevent and/or allow longitudinal movement of the outer tube within the third tube; wherein the third tube is longitudinally extendable from the outer tube manually by a user.

The telescoping support stand comprises three extendable legs.

The upper end of the connection housing is configured to engage an accessory or an accessory mounting assembly.

The upper end of the connection housing comprises an accessory platform and an accessory post.

The telescoping support stand comprises an accessory mounting assembly disposed on the accessory platform to mount to an accessory.

The accessory attachment assembly comprises an accessory mounting assembly housing having an internal socket and a ball joint comprising a ball housed within the internal socket.

A second aspect provides a telescoping support stand comprising: a handle comprising a trigger disposed within the handle, wherein the handle is attached to a bottom end of a connection housing, when the telescoping support stand is in normal use; wherein the trigger is accessible outside the handle assembly and includes first and second ends, the first end being pivotally attached to the handle assembly and the second end being movable radially inward and radially outward during operation; a plurality of extendable legs pivotably engaged near the top of the connection housing, each extendable leg comprising an outer tube; an inner tube having a first end portion that telescopically slides within the outer tube and a second end portion and a second end pivotably connected to the connection housing; and a locking mechanism mounted to the first end portion of inner tube; the connection housing comprising a plurality of pivot hubs and a release assembly within the connection housing configured to be actuated by the trigger; wherein the release assembly comprises a displacement rod extending from the connection housing into the handle in operational connectivity to the trigger and the release member in the connection housing; the release member is in operational connectivity to a plurality of release levers within the plurality of pivot hubs in the connection housing; and the plurality of release levers are in operational connectivity with a plurality of release rods; and each of the plurality of release rods is in operational connectivity to a respective locking mechanism within each of the extendable legs; and each locking mechanism comprises a plunger operationally connected to each release rod, a collar attached to the bottom of the inner tube and slidably engaged around the plunger; a helical spring disposed around the plunger and engaged at its upper end to the upper end of the plunger and its lower end engaged to the collar, a truncated cone member disposed around the plunger; a bearing retainer comprising a plurality of bearings circumferentially disposed around the bearing retainer; wherein the conical surface of the truncated cone member is configured to contact the plurality of bearings; wherein the locking mechanism is configured to move between a first position preventing the inner tube and the outer tube from moving relative to each other and a second position wherein the inner tube and the outer tube are allowed to move relative to each other; wherein actuation of the trigger actuates the release mechanism to release the locking mechanism within each of the plurality of extendable legs to allow the inner tube and the outer tube to move longitudinally relative to each other when the release assembly is activated.

Embodiments of the stand include the following and any of the previously listed embodiments, alone or in any combination.

In the first position, the trigger is disposed radially outward from the handle assembly, and the conical surface of the truncated cone member is in contact with the plurality of bearings, pressing them against an inner surface of the outer tube and preventing the inner tube and the outer tube from moving relative to each other.

In the second position, the trigger is disposed radially inward toward the handle assembly, the conical surface of the truncated cone member allows the bearings to move out of contact with the inner surface, allowing the inner tube and the outer tube to move relative to each other.

Each extendable leg comprises a pivot lock configured to engage one or more detents in the connection housing to independently define the amount of pivotable adjustment with respect to the handle, connection housing or with respect to each other.

Each leg further comprises a third or outermost tube comprising an open end cap disposed on a first end of the third tube around the outer tube comprising an extension lock configured to prevent and/or allow longitudinal movement of the outer tube within the third tube; wherein the third tube is longitudinally extendable from the outer tube manually by a user.

The telescoping support stand comprises three extendable legs.

The upper end of the connection housing is configured to engage an accessory or an accessory mounting assembly.

Another aspect provides an accessory attachment member configured to engage the connection housing of the telescoping support stands described above, comprising an accessory mounting assembly housing having an internal socket and a ball joint comprising a ball housed within the internal socket.

DETAILED DESCRIPTION

Disclosed herein is a telescoping support stand comprising a handle mounted below a connection housing and a plurality of extendable legs pivotably engaged near the top of the connection housing. The stand comprises a trigger disposed in the handle to actuate a release assembly within the housing to release a locking mechanism within the extendable legs to allow an inner tube and an outer tube to move longitudinally relative to each other when the release assembly is activated.

The disclosures of U.S. Pat. Nos. 9,010,710; 8,714,508; 8,469,326; 8,256,732; 8,146,876; and 7,845,602 are incorporated, in their entireties, by this reference.

The release assembly may comprise a displacement rod extending from the connection housing into the handle in operational connectivity to a release member in the connection housing, which is in operational connectivity to a plurality of release levers. The release levers are in operational connectivity to a plurality of release levers within a plurality of pivot hubs in the connection housing, which in turn are in operational connectivity to a plurality of release rods within the plurality of extendable legs. The release rods are in operational connectivity to a locking mechanism within each extendable leg, In a first (rest) position of the trigger, the release assembly in communication with the locking mechanism prevents longitudinal movement of inner tube and outer tube relative to each other.

When a user activates the trigger, moving it to a second (release) position, upward movement of the displacement rod moves release member upward inside the connection housing causing each release lever to pivot around a pivot within each respective pivot hub and moves release rod downward in inner tube to release the locking mechanism to allow the inner tube and outer tube to move longitudinally relative to each other, when the release rod 63 is moved downward.

Figure 1A:
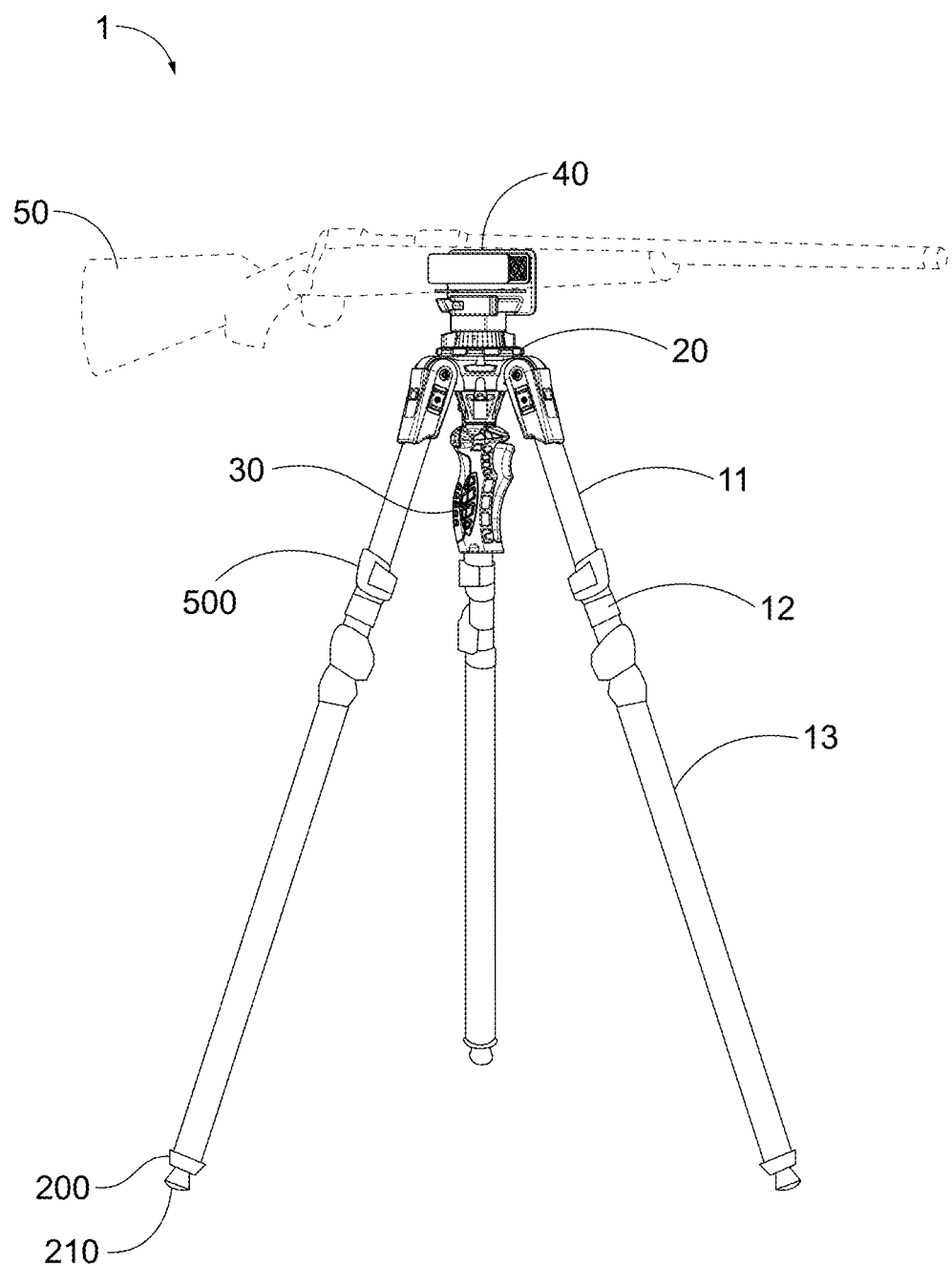
FIGS. 1A-1D show perspective views of a stand according to an embodiment of the disclosed subject matter.

FIG. 1A shows a perspective view of a telescoping stand 1 according to an embodiment of the disclosed subject matter. The telescoping stand is configured to provide stable support on uneven terrain for an accessory engaged to the stand. The embodiment of the stand 1 shown has three extendable telescoping legs 10 but that is not limiting. Other embodiments comprise two telescoping legs 10, or 4 telescoping legs 10. Each leg 10 comprises a first or inner tube 11, a second or outer tube 12 and optionally a third or outermost tube 13. Inner tube 11 has a first end portion configured to engage the connection housing 20 and a second end portion (not shown) that telescopically slides within the outer tube 12. The lower end of outer tube 12 also telescopically slides within the optional third tube 13 when it is present. In the view shown, each second tube is fully slid into its respective third tube 13. Optionally as shown, each of tubes 12 and 13 comprise an extension lock 500 disposed on their respective upper ends.

A handle 30 is mounted to a first end of the connection housing 20. Each leg 10 is pivotably engaged to a second end of the connection housing 20 at the first (upper) end portion of the first tube. As shown in FIG. 1A, in normal operational orientation, the handle 30 is mounted below the connection housing 20 and the legs 10 are pivotably engaged proximate to the upper end of the connection housing, above the handle. The upper end of the connection housing 20 is configured to support an accessory 50, as illustrated a firearm, optionally supported by an accessory attachment member or mount 40.

In the embodiment shown in FIG. 1A, the accessory 50 is a gun or firearm (e.g. rifle) and the accessory attachment member 40 is a gun mount, but that is not limiting. In other embodiments the accessory comprises a projectile weapon such as a gun, rifle, air rifle, compressed-gas gun, crossbow and the like; an optical device such as a camera, camcorder, laser rangefinder, professional photography equipment such as a telephoto lens; telescope; or surveyors' equipment such as a theodolite, transit or total station; and the accessory attachment member may comprise a gun rest, gun mount, microphone clip, camera mount or telescope mount. It can be appreciated that some mounts and rests configured to support a gun are not limited to supporting a gun, but can support any piece of equipment that a user may desire to support.

Figure 1B:
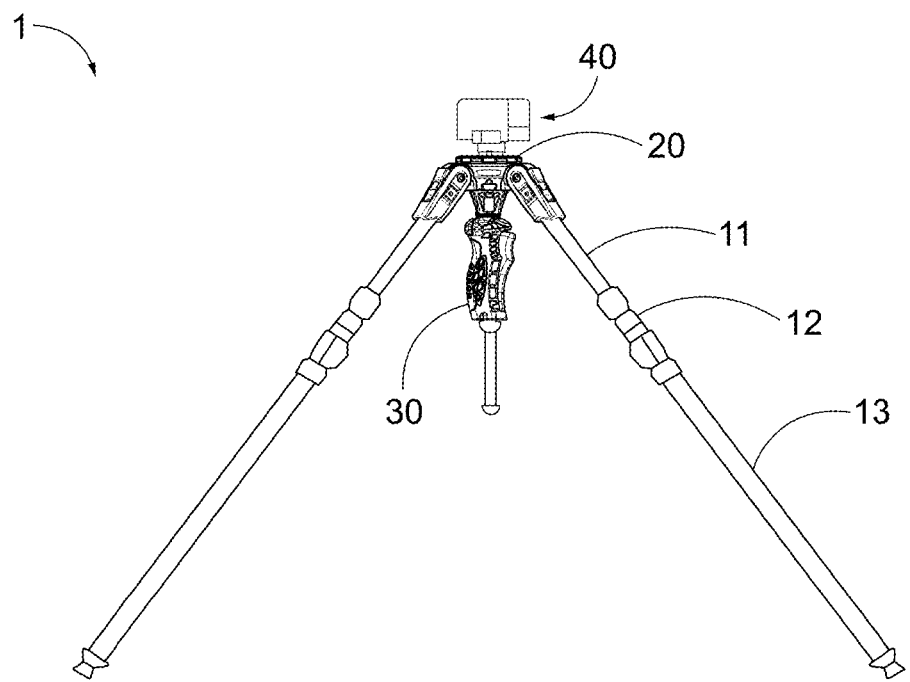
Figure 1C:
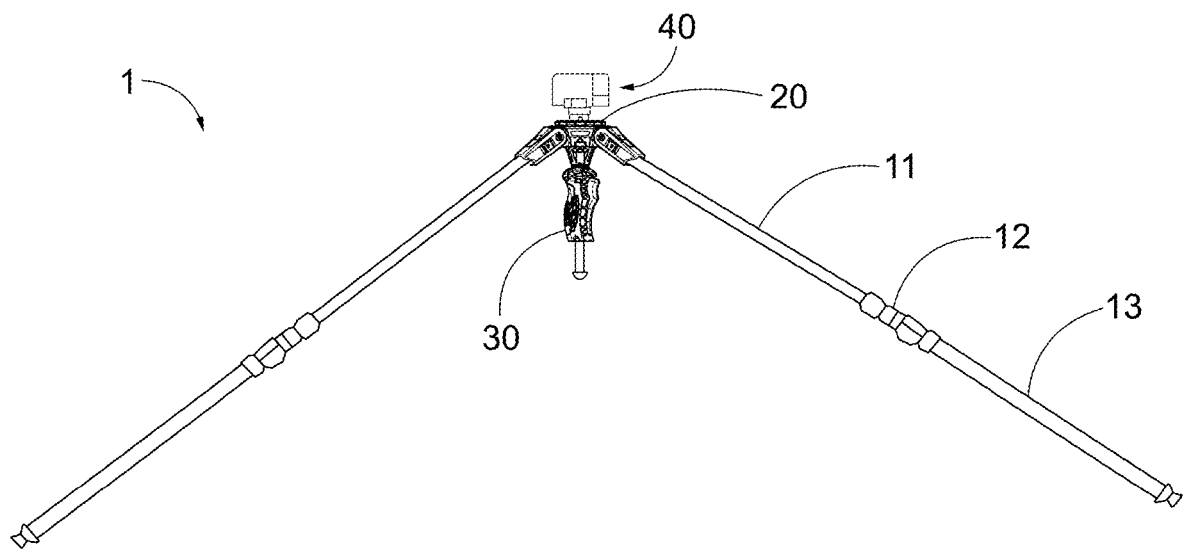
Figure 1D:
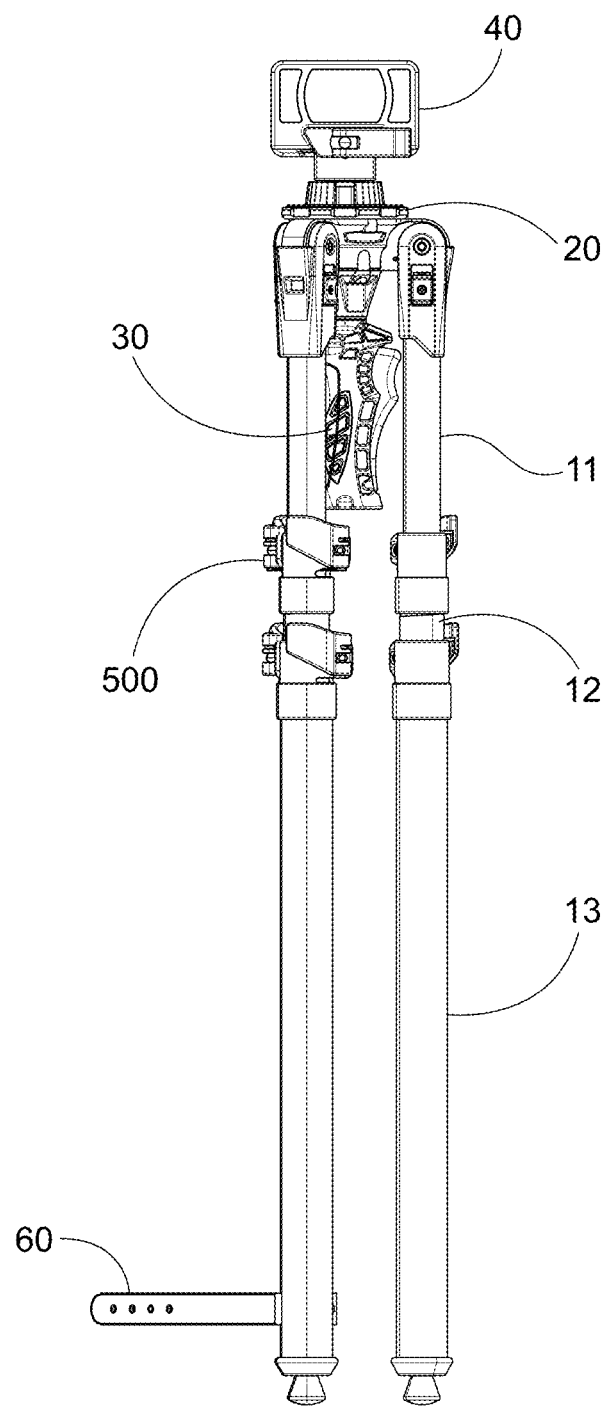

In embodiments, the stance of the legs of the stand can be independently varied by changing the amount of pivot for each leg relative to the connection housing. FIG. 1A shows the legs in a normal open stance. FIG. 1B shows the legs in a wide stance and FIG. 1C shows the legs in an extra-wide stance. FIG. 1C also shows each first tube fully extended out of each second tube. The different stances may be useful in positioning the stand on uneven terrain. As can be seen, the stances may also provide different heights of the accessory above the ground, depending also on how far the legs are extended. For example but not limitation, the normal open stance may provide a stand to hold a rifle for a user to use a standing shooting position, the wide stance may allow for a kneeling shooting position and the extra-wide stance may allow for a prone shooting position. FIG. 1D shows the legs of the stand in a closed stance, for example, for storage or transport. Additional length for each of the legs 10 can be obtained by opening extension clamps 500 at the top of the optional third tube to allow the lower end of second tube 12 to be slid out of the top end of the third tube.

Figure 2A:
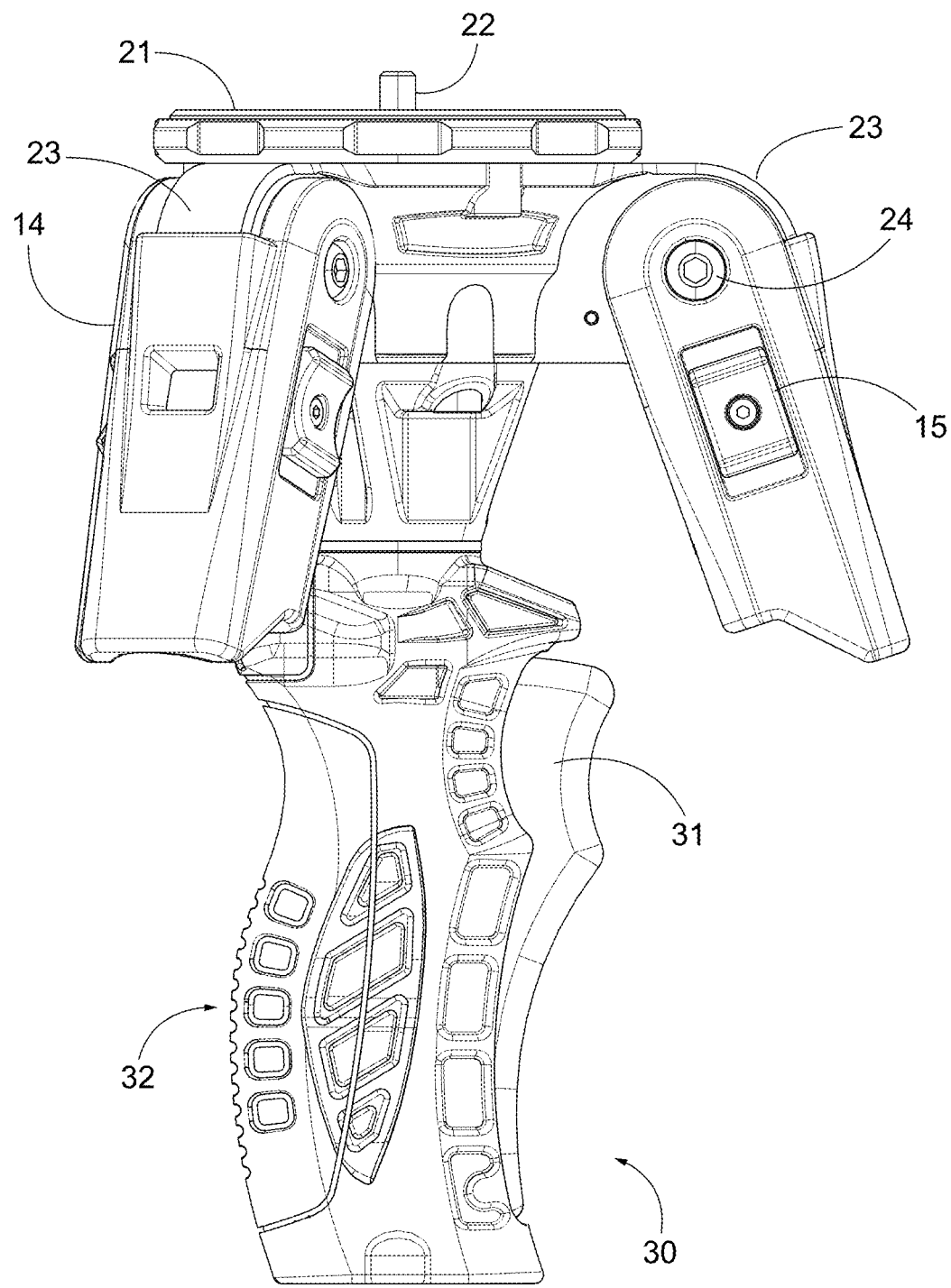
FIG. 2A shows a close-up side view of a stand according to an embodiment of the disclosed subject matter.
Figure 2B:
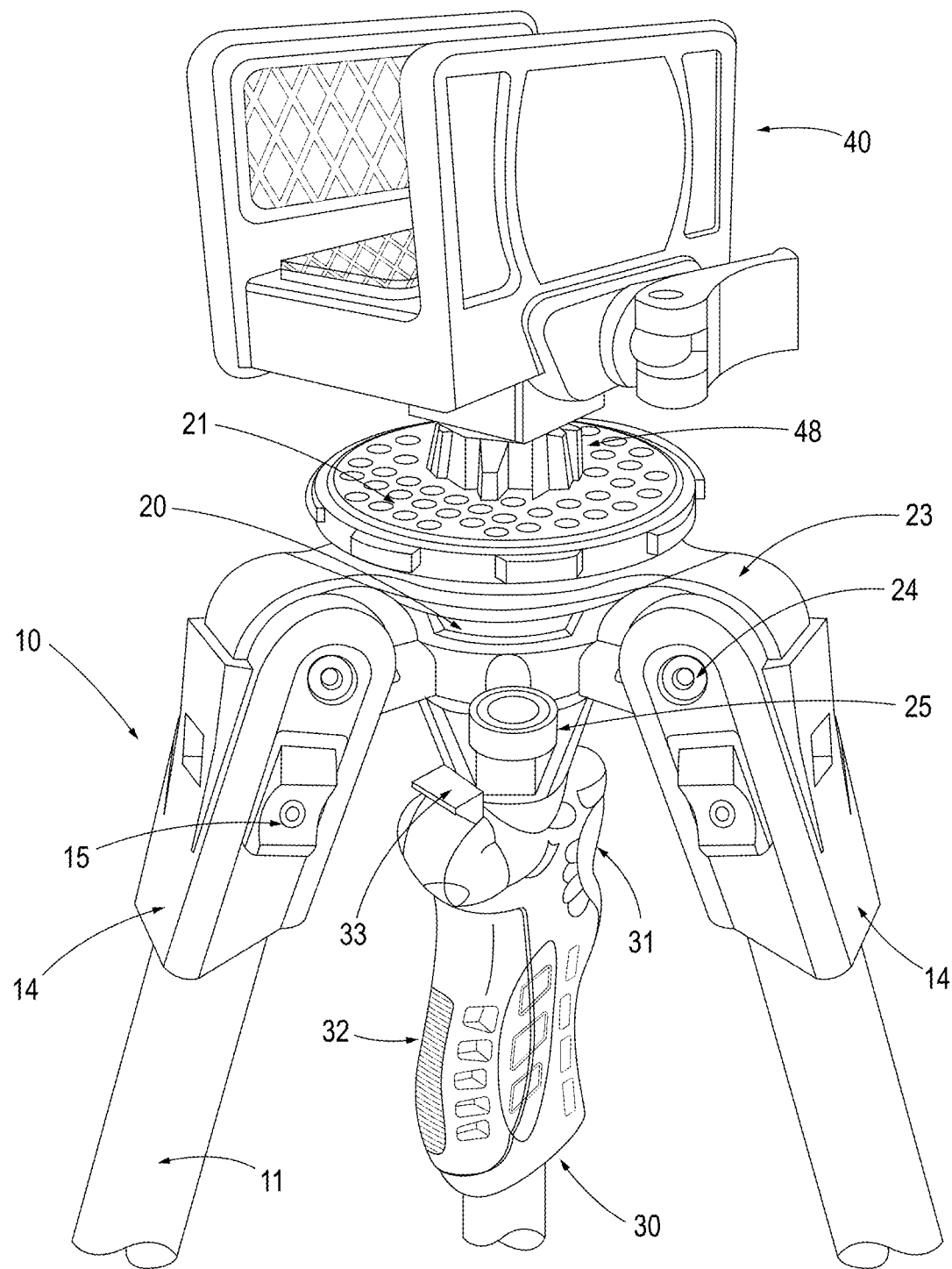
FIG. 2B shows a perspective close-up view of a stand with an accessory mount thereon according to an embodiment of the disclosed subject matter.

FIG. 2A shows a close-up side view of the connection housing 20, handle 30 and the upper end fittings 14 configured to engage the upper ends of the legs 10 and FIG. 2B shows a perspective view of the connection housing 20, handle 30 and the upper end fittings 14 of the legs 10 with an exemplary accessory mount 40 engaged thereon. In these figures, the legs 10, in particular inner tubes 11, are omitted or truncated for ease of presentation. The upper end of connection housing 20 may comprise a generally planar surface or platform 21 and an accessory post 22. The platform 21 and accessory post 22 are configured to engage an accessory or accessory attachment member as described above. For example but not limitation, post 22 may be threaded to engage a complementary threaded socket on an accessory or accessory attachment member. In the embodiment shown in FIG. 2B, mounting ring 48 on the bottom of the mount 40 is engaged to the post 22 (not shown). Connection housing 20 comprises a plurality of pivot hubs 23 comprising pivot members 24. The pivot hubs 23 and pivot members 24 are configured to engage the upper end fitting 14 of each of legs 10 at the second end of inner tube 11. The pivot hubs are spaced apart around the circumference of the connection housing so that the engaged legs 10 are also spaced apart. In embodiments, the pivot hubs 23 may be equally spaced apart. In the embodiment with three legs shown in FIG. 2C, the pivot hubs 23 may be spaced at 120° angles. For a bipod stand with two legs (not shown), the pivot hubs may be diametrically disposed on the connection housing. Connection housing optionally comprises a level 25, such as a bubble level, to facilitate a user placing the stand in suitable orientation for supporting an accessory. For example, it may be desirable to have the platform 21 level so that an accessory positioned thereon is also level.

Legs 10 pivotably engage the pivot hubs 23 via fittings 14 so that they can pivot from a closed position (shown in FIG. 1D) wherein the legs are drawn toward a central vertical axis through the connection housing 20, to an open position as shown in FIGS. 1A, 1B, 1C and 2A. Pivot lock members 15 on each leg may be independently engaged to detents 26 (see FIGS. 3A and 3B) within the pivot hubs 23 that define the angle of pivot away from the vertical axis, so that each leg can be individually pivoted at a specific pivot angle.

Handle 30 comprises a trigger 31 mounted within a grip 32. The trigger is configured to release a release assembly within the connection housing 20 to allow the inner tube 11 to slidingly move within outer tube 12. An optional trigger lock 33 is configured to selectively lock the trigger so that it cannot be pulled by a user and inadvertently release the extension release assembly.

Figure 2C:
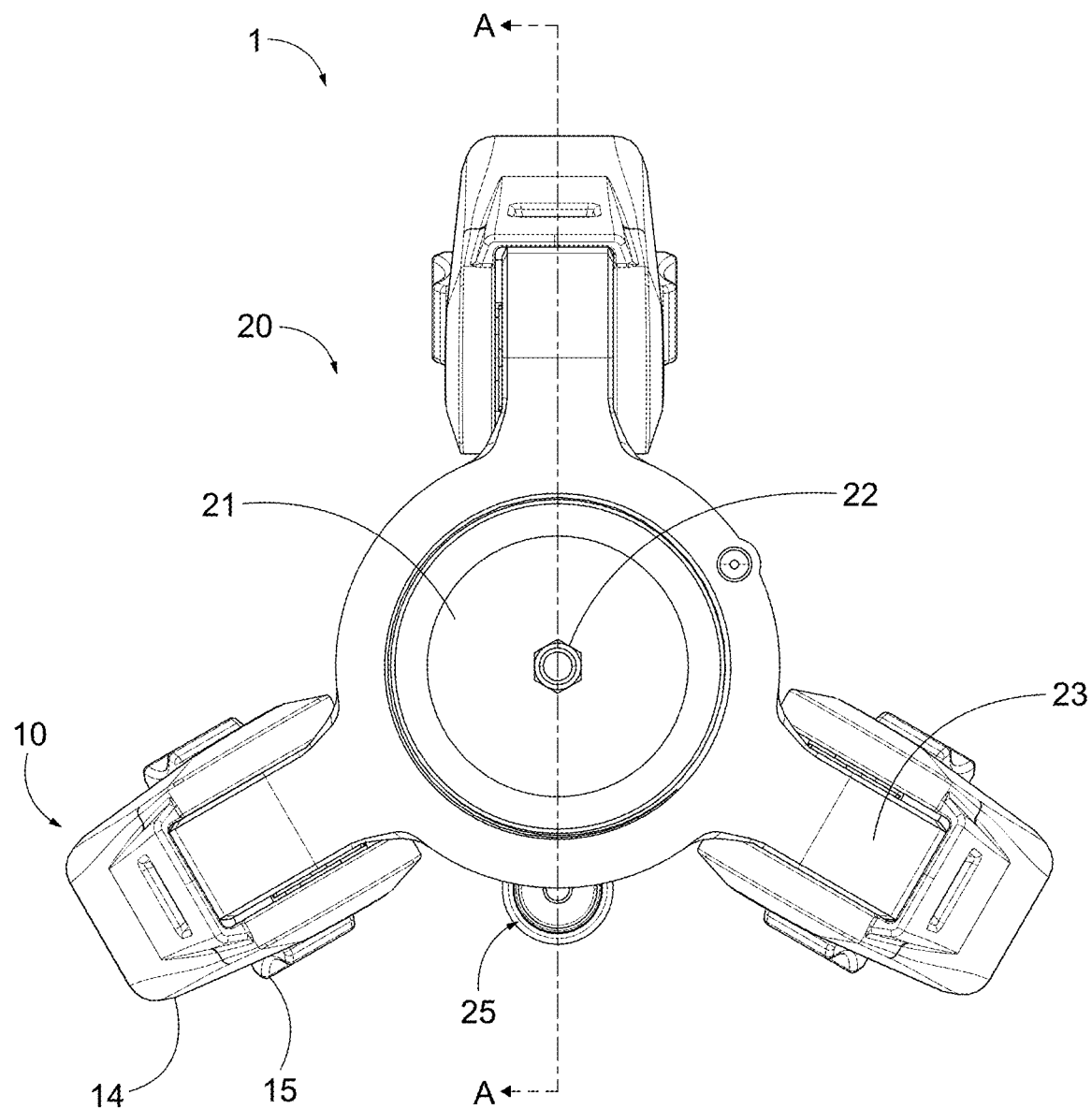
FIG. 2C shows an overhead plan view of a stand according to an embodiment of the disclosed subject matter.
Figure 3A:
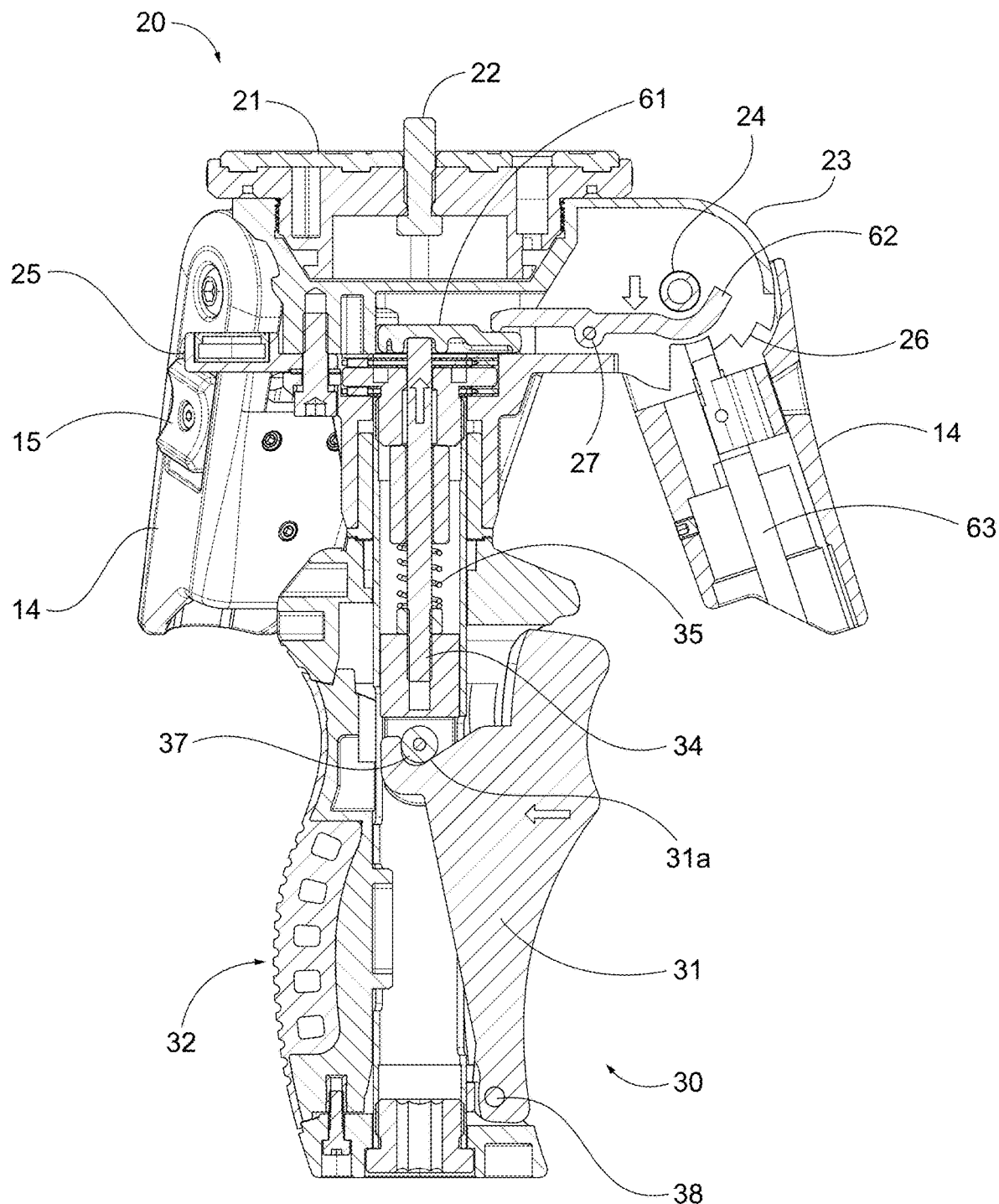
FIGS. 3A and 3B are cross-sectional side views of the telescoping support stand illustrated in FIG. 1 according to an embodiment of the disclosed subject matter.
Figure 3B:
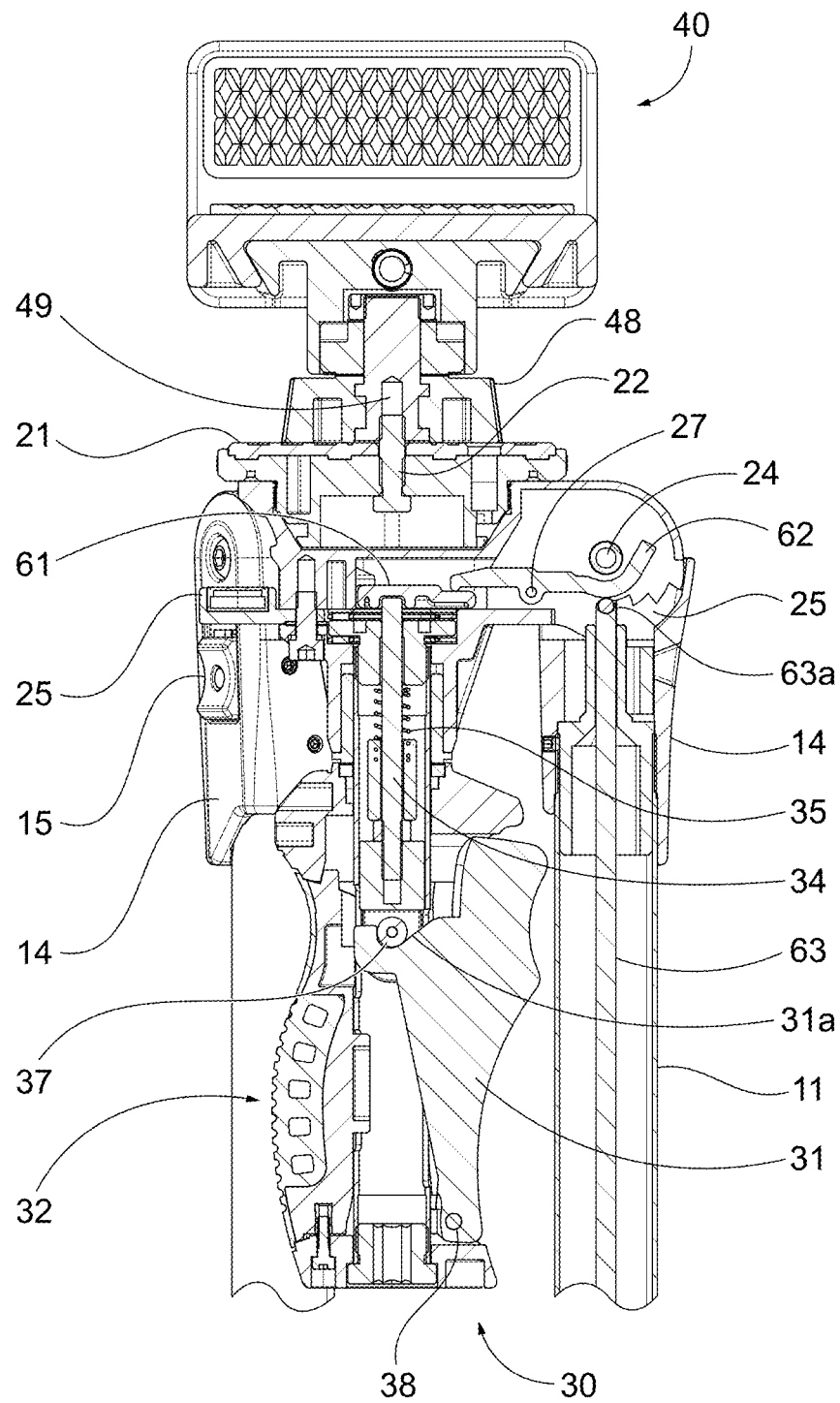

FIG. 3A shows a close-up cutaway view of the stand 1 showing a cross-section taken along line A-A' shown in FIG. 2C of the connection housing 20, handle 30 and one of the legs 10. When a user moves the trigger 31 about pivot 38 in the direction shown by the arrow, the curved portion 31a moves wheel 37 along the curved surface 31a to raise rod 34 upward in the connection housing and compresses spring 35. The upward movement of rod 34 also moves release member 61 upward inside the connection housing 20. Member 61 may be a circular disk shape, optionally comprising radial projections, configured to engage a plurality of release lever members 62, within each pivot hub 23, causing it to pivot around pivot 27 within each pivot hub 23. Member 62 moves release rod 63 downward in tube 11. When the release rod 63 is moved downward, it releases locking mechanism 170 described in relation to FIGS. 4A or locking mechanism 470 in FIGS. 4B-4F to allow first or inner tube 11 to move longitudinally within second or outer tube 12. Release of the trigger 31 allows spring 35 to expand, thereby moving rod 34 and member 61 downward. This causes member 62 to pivot upward and allow release rod 63 to return upward and lock locking mechanism 170 or 470 so that inner tube 11 is prevented from moving longitudinally within outer tube 12. Similar members are disposed in each pivot hub 23 and legs 10.

Figure 4A:
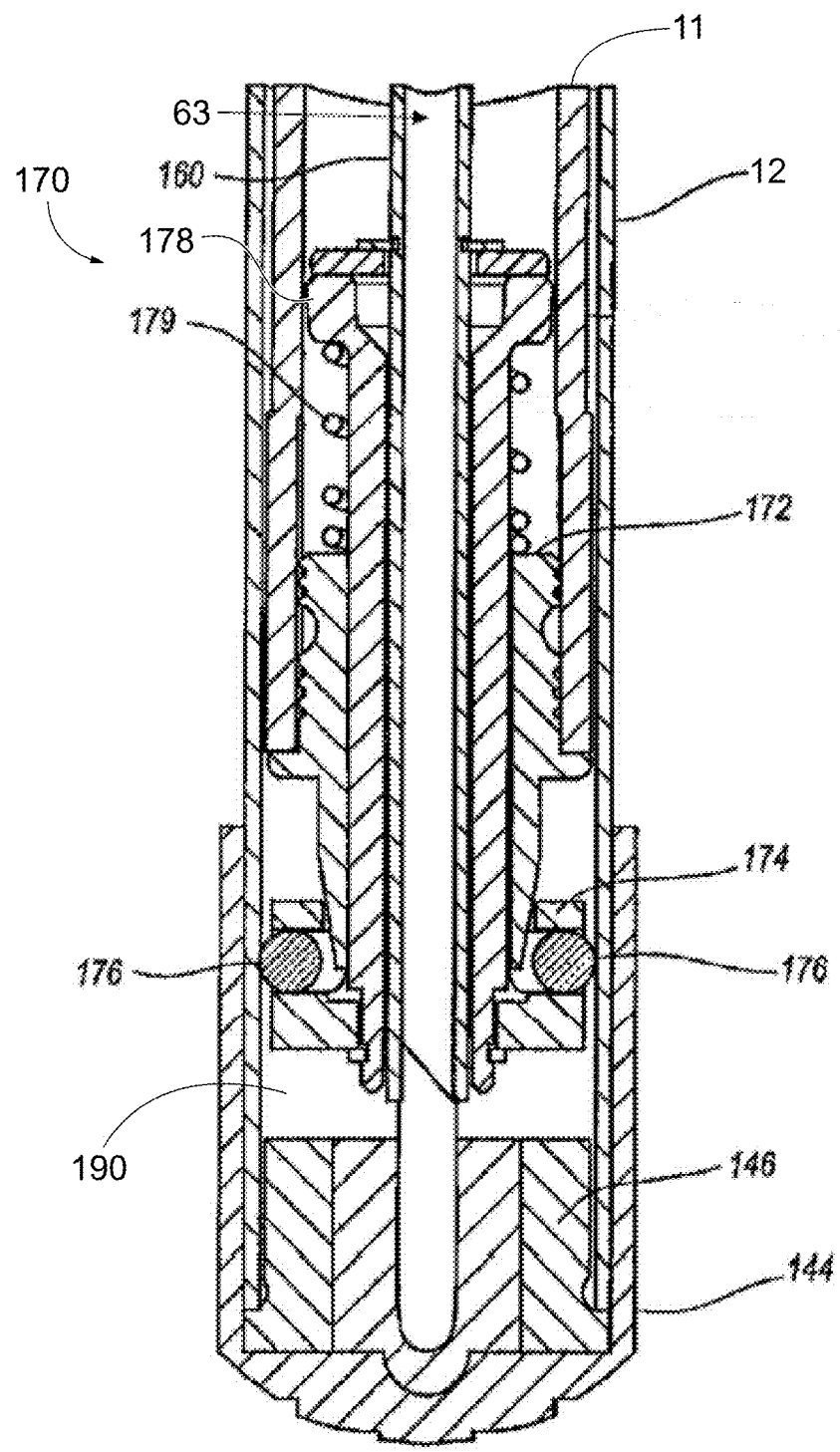
FIG. 4A is a cross-sectional side view of a locking mechanism of a telescoping support stand illustrated in FIG. 1A according to an embodiment of the disclosed subject matter.

FIG. 4A is a cross-sectional diagram of a bottom portion of a leg 10 of telescoping shooting stand 1, in which the optional third tube 13 is not present, to show an embodiment of a locking mechanism 170. In this view, the inner tube 11 is fully retracted into outer tube 12 such that the locking mechanism 170 attached to the lower end of inner tube 11 is disposed at the bottom of outer leg 12, and the leg 10 is at its shortest length. FIG. 4A shows that locking mechanism 170 may include a truncated-cone member 172, a release rod 63, a release rod guide tube 160, a bearing retainer 174, bearings 176, a tubular plunger 178, and a spring 179. FIG. 4A also shows outer end cap 144 and an inner end cap 146. In this figure, plunger 178 may be a cylinder with an opening (lumen) through the middle, wherein the opening may receive release rod 63 disposed inside the open lumen inside plunger 178. Rod 63 may extend through plunger 178 into a pocket in inner end cap 146.

Plunger 178 may be attached to release rod 63 so that plunger 178 will move when release rod 63 moves.

Bearing retainer 174 may hold bearings 176 in place and may be attached to tubular member 178. Truncated-cone member 172, in some embodiments, may be disposed around plunger 178 such that a tapered portion of truncated-cone member 172 comes into contact with bearings 176. A top portion of truncated-cone member 172 may be threaded to allow truncated-cone member 172 to attach to inner tube 11. Thus, when release rod 63 moves plunger 178 and bearing retainer 174 in a downward direction, truncated-cone member 172 may stay stationary relative to tubular member 178 and bearing retainer 174. Spring 179 may be positioned on top of or within truncated cone member 172 and may bias plunger 178 and bearing retainer 174 in a first position. In the first position, bearing retainer 174 holds bearings 176 against a top section of the tapered portion of truncated-cone member 172 such that truncated cone member 172 presses bearings 176 against an inside surface of outer tube 12. Thus, when bearing retainer 174 is in the first position, bearings 176 may prevent longitudinal movement of outer tube 12 relative to inner tube 11.

As previously mentioned, release rod 63 may press plunger 178 and bearing retainer 174 downward to a second position. In the second position, a lower portion of the tapered section of truncated-cone member 172 allows bearings 176 to move away from the inside surface of outer tube 12. Thus, in the second position, bearings 176 may not be forced against the inside surface of outer tube 12, allowing longitudinal movement of outer tube 12 relative to inner tube 11. Telescoping support stand 1 may include air exchange apertures, for example in inner cap 146, that allow air to enter and exit enclosed area 190, thereby reducing or eliminating the vacuum and dampening affects caused when enclosed area 190 is substantially sealed.

It should be appreciated that although the locking mechanism 170 is shown in a telescoping leg with an inner tube 11 and an outer tube 12, the locking mechanism 170 can be used with an optional third tube 13 disposed outside the outer tube 12. When the stand 1 comprises the optional third tube 13 on each of legs 10, the end cap 144 is not used and outer tube 12 is configured to be slidingly engaged inside third tube 13.

FIGS. 4B-4F show another notable embodiment of a locking mechanism 470 within a telescoping leg comprising three telescoping tubes. In these views, the inner tube 11 is fully retracted into outer tube 12 such that the locking mechanism 170 attached to the lower end of inner tube 11 is disposed at the bottom of outer leg 12, and the outer tube 12 is fully retracted into a third (outermost) tube 13 and the leg 10 is at its shortest length.

Figure 4B:
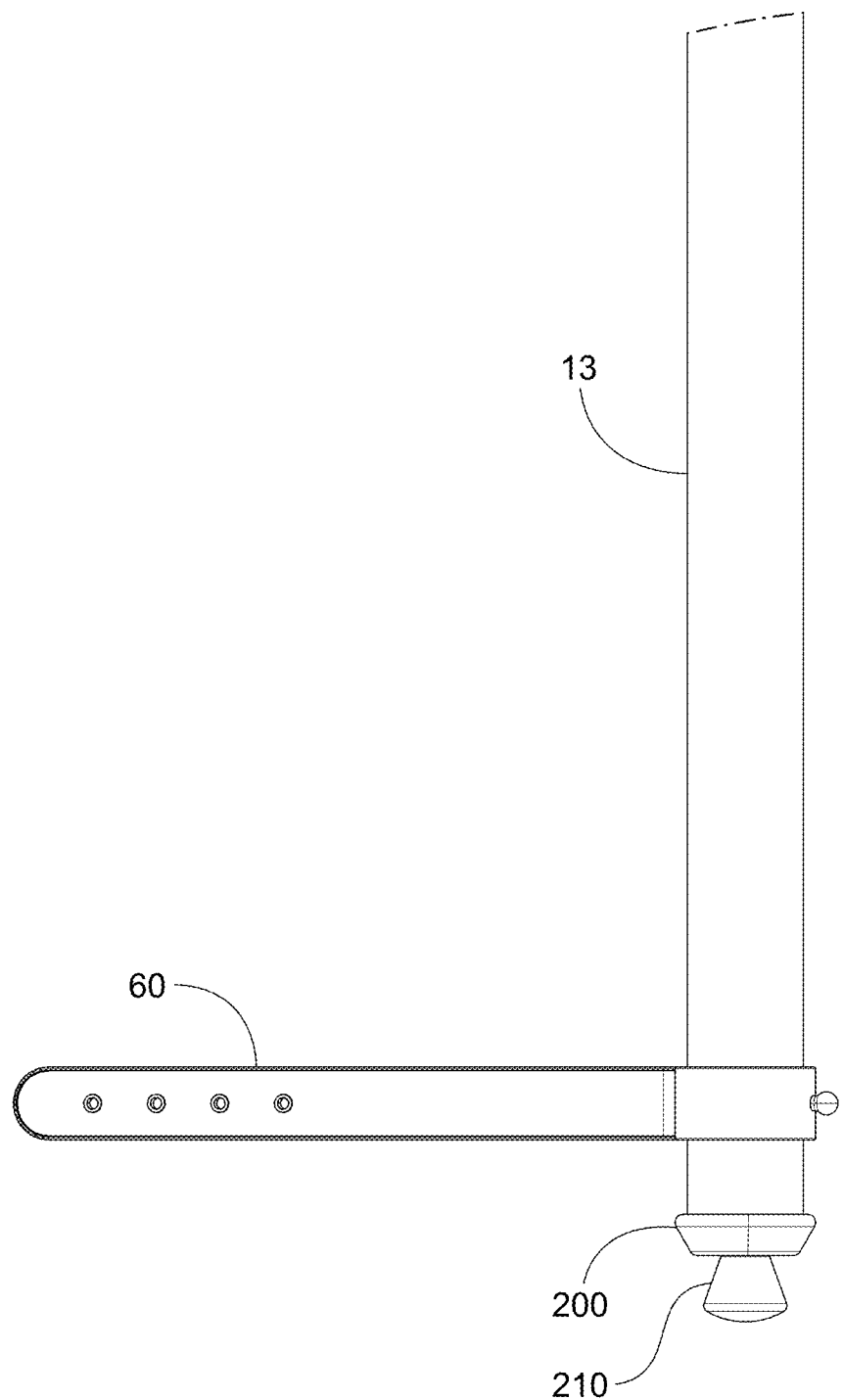
FIGS. 4B-4F show aspects of a locking mechanism of a telescoping support stand illustrated in FIG. 1A according to another embodiment of the disclosed subject matter.
Figure 4C:
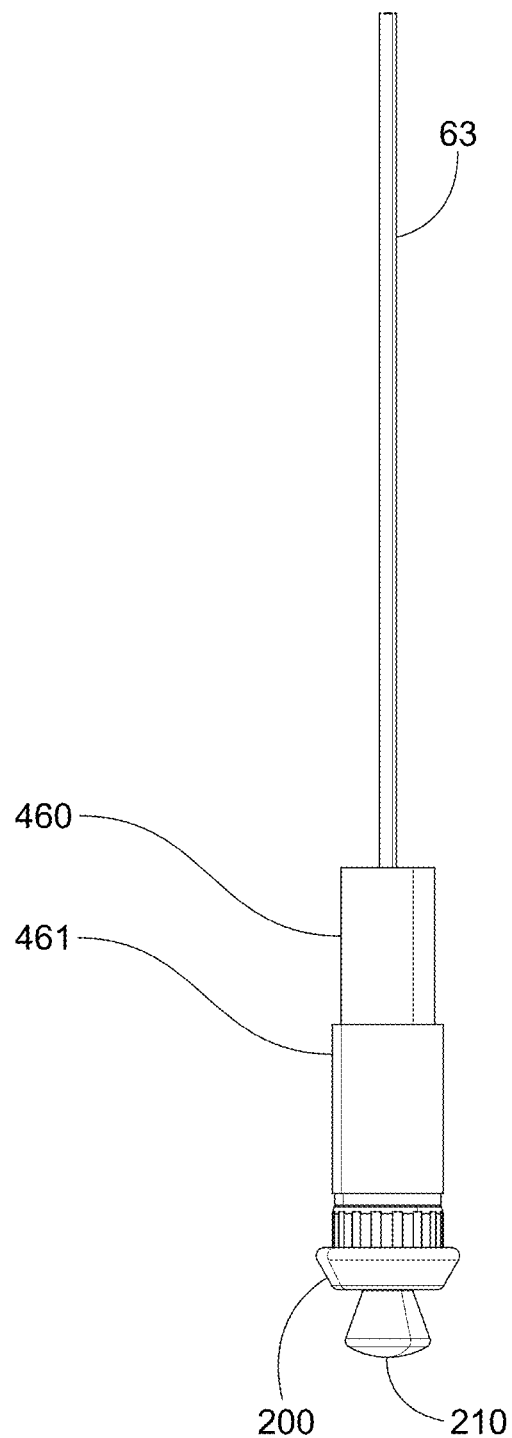
Figure 4D:
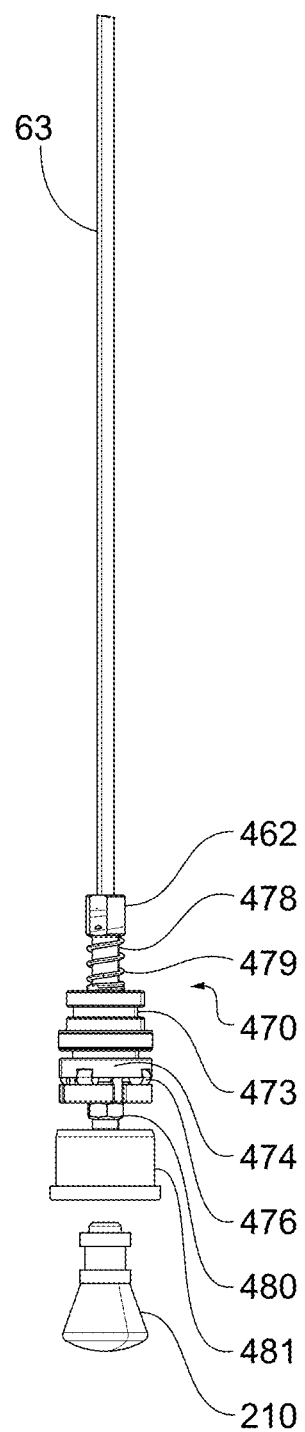

FIG. 4B-4D shows 3 legs 10 at varied levels of disassembly to show the locking mechanism 470. The leg in FIG. 4B is shown fully assembled, wherein outermost tube 13 encloses outer tube 12, inner tube 11 and locking mechanism 470. An end cap 200 and foot 210 are shown disposed at the lower end of outer tube 13. Optional strap 60 is shown disposed near the bottom of tube 13.

In the leg shown in FIG. 4C, tubes 11, 12 and 13 are removed. Jacket 460 may be disposed around the locking mechanism 470 between inner tube 11 and outer tube 12 to enclose the mechanism and provide separation between tubes 11 and 12 to reduce contact along their lengths. Jacket 461 may be disposed around the locking mechanism 470 between outer tube 12 and outermost tube 13 to enclose the mechanism and provide separation between tubes 12 and 13 to reduce contact along their lengths. Release rod 63 is shown extending upward toward the release mechanism in the connection housing described above.

In the leg shown in FIG. 4D, the jackets 460 and 461 are removed to show the internal components of the locking mechanism 470. Release rod 63 is in operational connectivity to a cylindrical plunger 478 via locking element 462 so that plunger 478 will move when rod 63 moves. Collar 473 is attached to the bottom of inner tube 11 and is slidably engaged around plunger 478. A helical spring 479 is disposed around plunger 478 and engaged at its upper end to the wider upper end of plunger 478. The lower end of spring 479 is engaged to the upper end of collar 473. A bearing retainer 474 comprising a plurality of bearings 476 circumferentially disposed around bearing retainer 474 is attached to the bottom of plunger 478 with nut 480. Nut 480 may be in contact with an inner plug 481 configured to engage the bottom inside surface of outer tube 12, comprising one or more air passages 482 (see FIG. 4D).

Figure 4E:
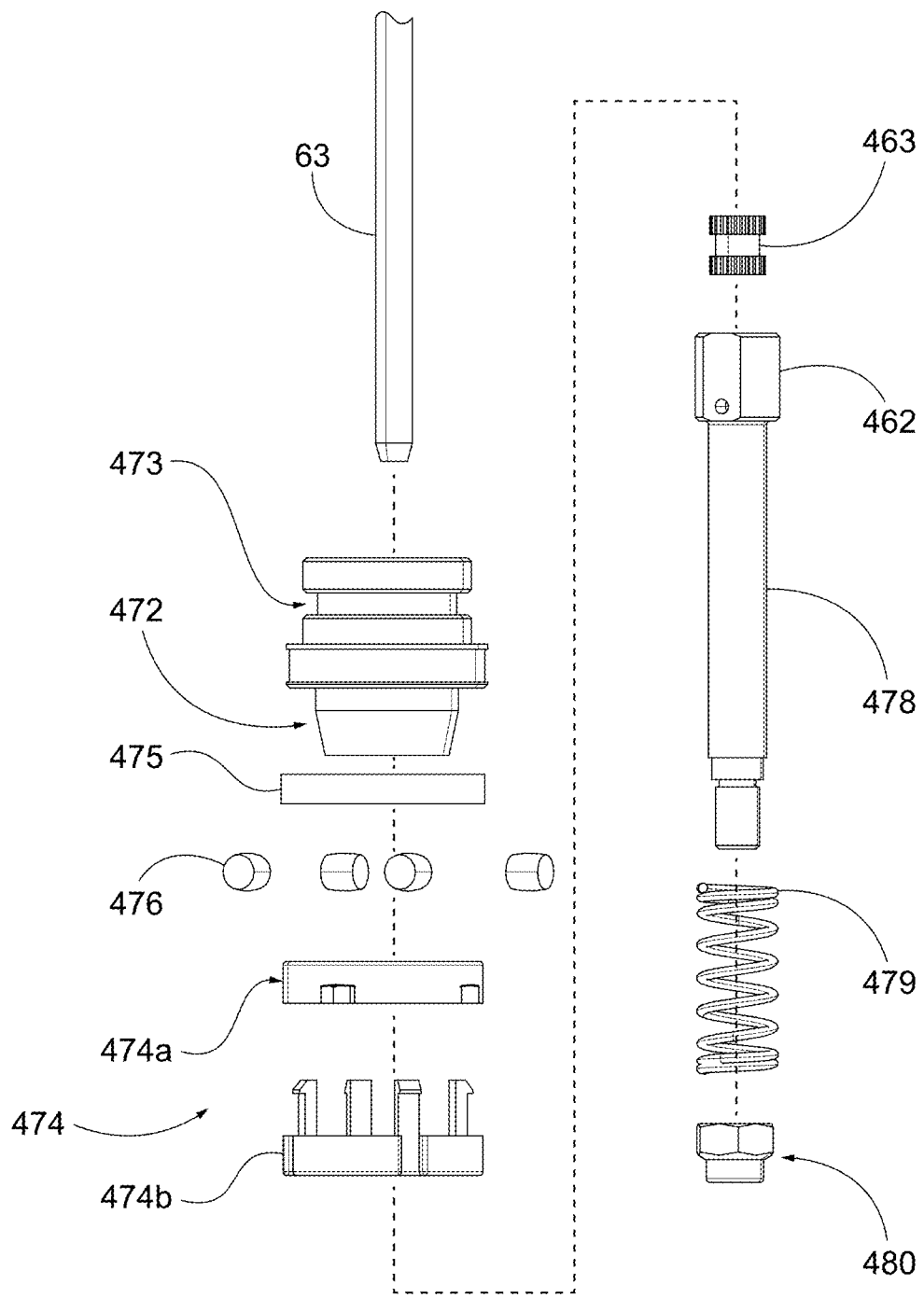

FIG. 4E shows a close-up exploded view of locking mechanism 470. Release rod 63 is into the fitting 463 and both are inserted into locking element 462 on plunger 478 to lock it onto the upper end of plunger 478. Collar 473 is slidingly engaged to the lower end of plunger 478 such that helical spring 479 is engaged between the wider locking element 462 on plunger 478 and the upper surface of collar 473. In this view, truncated cone member 472 on the bottom of collar 473 is shown. Ring 475 is disposed around the widest diameter of collar 473 and engages the inner surface of tube 12 (see FIG. 4D). Top 474a and bottom 474b of bearing retainer 474 are snapped together to trap bearings 476 at the outer edge of bearing retainer 474, which is disposed below collar 473 at the bottom end of plunger 478. Nut 480 locks the bottom of mechanism 470 so that the stack of component are held between locking element 462 and nut 480.

Figure 4F:
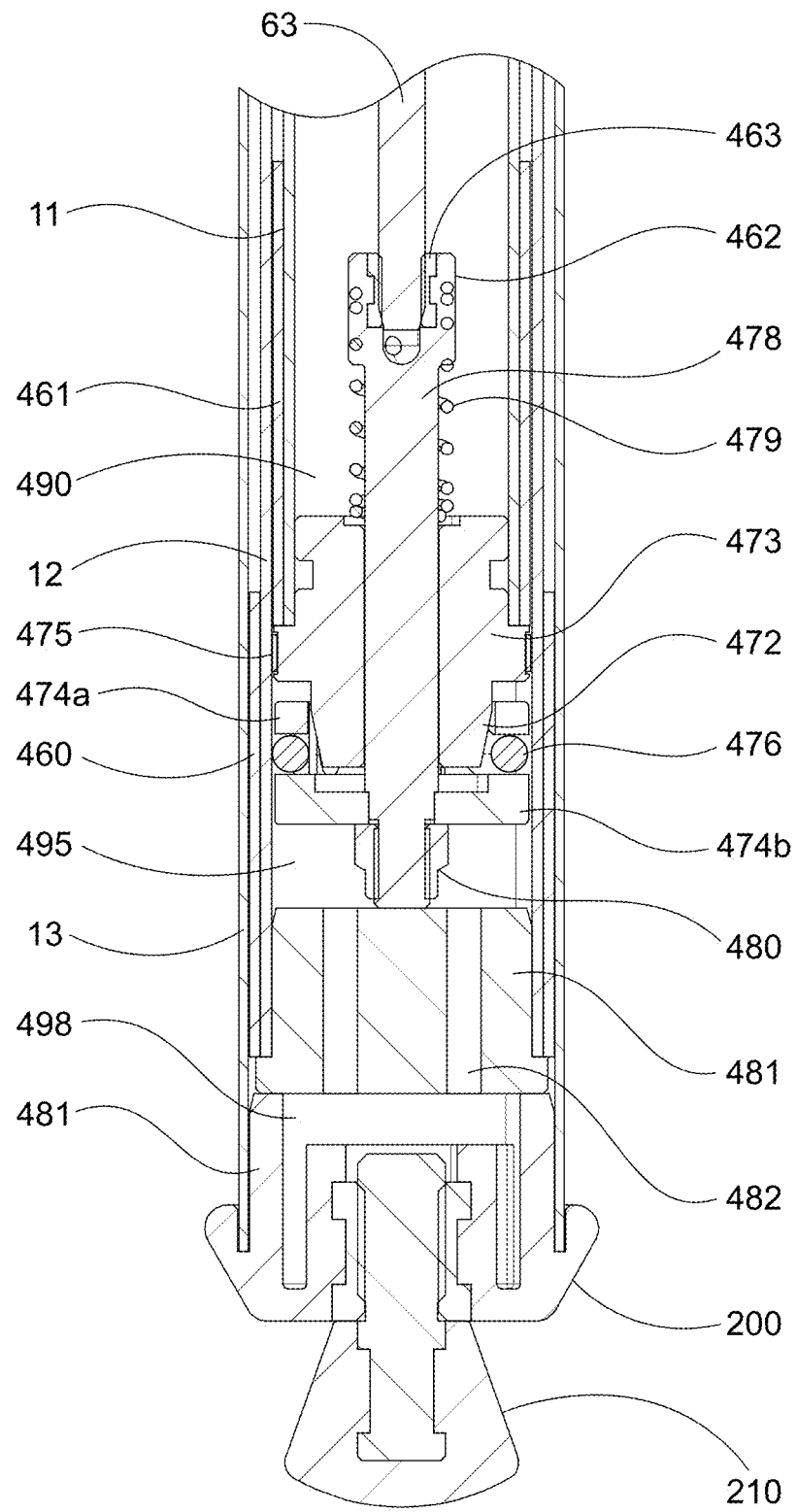

FIG. 4F shows a cross-section of the locking mechanism 470 inside the leg 10. From outside to inside the tubular members of leg 10 include outermost tube 13, jacket 461, outer tube 12, jacket 460 and inner tube 11, with locking mechanism 470 disposed within inner tube 11. FIG. 4F shows that, as previously described, locking mechanism 470 may include a truncated-cone member 472, a bearing retainer 474, bearings 476, a tubular member 478, and a spring 479, as previously described. FIG. 4F also shows from bottom to top, foot 210, end cap 200 and inner cap 481.

Bearing retainer 474 may hold bearings 476 in place and may be attached to plunger 478. Truncated-cone member 472, in some embodiments, may be disposed around plunger 478 such that a tapered portion of truncated-cone member 472 can come into contact with bearings 476. As shown in this embodiment, truncated cone member is integral to collar 473, but in alternative embodiments, top portion of truncated-cone member 472 may be threaded to allow truncated-cone member 472 to attach to inner tube 114. When in the locked configuration shown, the conical surface of truncated cone member is in contact with the bearings 476 and presses them outward to contact the inner surface of outer tube 116, holding it in place so that inner tube 114 and outer tube 116 cannot move longitudinally in relation to each other.

Because truncated-cone member 472 is attached to inner tube 11 (via collar 473), it may stay stationary relative to plunger 478 and bearing retainer 474. Spring 479 may be positioned above truncated cone member 472 and may bias plunger 478 and bearing retainer 474 in a first position. In the first position (locking position), bearing retainer 474 holds bearings 476 against a top section of the tapered portion of truncated-cone member 472 such that truncated cone member 472 presses bearings 476 against an inside surface of outer tube 12. Thus, when bearing retainer 474 is in the first position, bearings 476 may prevent longitudinal movement of outer tube 12 relative to inner tube 11.

When release rod 63 is moved downward when the trigger is manipulated as described above, it moves release rod 63, plunger 478 and bearing retainer 474 in a downward direction to a second (release) position. Downward movement of plunger 478 relative to collar 473, which is fixed to the end of inner tube 11, compresses helical spring 479. In the second position, a lower, narrower portion of the tapered section of truncated-cone member 472 allows bearings 476 to move away from the inside surface of outer tube 12. Thus, in the second position, bearings 476 may not be forced against the inside surface of outer tube 12, allowing longitudinal movement of outer tube 116 relative to inner tube 114, thereby allowing extension of leg 10. Downward movement of plunger 478 may also cause nut 480 to engage the top of inner end cap 481 inside outer tube 12, pushing outer tube 12 downward relative to inner tube 11, initiating longitudinal movement. Telescoping support stand 1 may include air exchange passages 482 in inner end cap 481 that allow air to enter and exit enclosed volume 490 between inner and outer tubes 11, 12 and enclosed volumes 495 and 498 between outer and outermost tubes 12, 13, thereby reducing or eliminating the vacuum and dampening affects caused when enclosed areas 490, 495 and 498 are substantially sealed.

Releasing the trigger 31 allows spring 35 to decompress and displacement rod to move downward, the end of release lever and release rod engaged to release lever to move upward. This in turn allows spring 479 to decompress and move plunger 478 upward, relocking the locking mechanism 470.

Notably, the locking mechanisms 170 or 470 does not extend past the end of inner tube 11, so that the release mechanism does not apply to movement of the outer tube 12 within the third tube 13. In these embodiments, when the third tube is present the leg can be extended longitudinally by a user manually pulling the third tube from the outer tube. The upper end of the third tube 13 preferably has an external extension lock (see below) disposed thereon so that manual movement of the outer tube 12 within the third tube 13 can be selectively controlled. Thus, each leg can be extended using the release mechanisms described herein to extend the length of the leg by extending the inner tube longitudinally from the outer tube and/or manually extending the third outermost tube longitudinally from the outer tube, allowing for great flexibility in determining the length of each leg independently to provide a stable stand to rest on highly varied terrain.

It should be appreciated that locking mechanism 470 is shown in FIGS. 4B-4D in a leg 10 comprising three extension tubes 11, 12 and 13. However, locking mechanism can be used in a telescoping leg having two extension tubes 11 and 12. In this embodiment, outermost tube 13 and jacket 461 are not included and an end cap analogous to cap 200 is attached at the bottom of outer tube 12 to attach foot 210 thereto.

Thus, when a user pulls trigger 31, the release mechanism comprising members 61, 62 and release rod 63, locking mechanism 170 or 470 is released, allowing the tube 11 and 12 to move longitudinally in relation to each other. When the trigger is released, the release mechanism locks the tubes 11 and 12 in their relative positions when the trigger is released. For example, when the stand is in its normal upright position, pulling the trigger 31 will cause the release mechanism 170 or 470 to release and outer tube 12 can move longitudinally downward by gravitational force until it reaches a barrier to further movement, such as the ground. At that point, release of the trigger 31 will cause the tubes to be locked together at an extended length. Although each leg 10 comprises a release mechanism 170 or 470, the stand is configured so that when the release mechanism is released, each leg can independently extend downward until the ground is reached. As discussed above, when an outermost tube 13 is present, extension locks 500 may be disengaged to allow movement of tube 12 inside tube 13. In this way, a user can set up the stand 1 by pivoting the legs 10 independently outward toward one of three pivot positions. Then the user can hold the handle 30 at a desired position above the ground, which may be rough terrain. Pulling the trigger 31 releases the lock mechanism 170 or 470 in each leg, allowing the outer tube 12 to independently drop downward toward the ground. Releasing the trigger 31 will lock the legs and thereby the stand in the positions they were when downward movement was halted by the ground. Extension locks 500 on tube 12 and optional tube 13 (see below) may be closed to prevent longitudinal movement. When a user wants to retract the legs back into their shortest length, the user may grasp the handle 30 and pull the trigger 31, allowing the outer tube 12 to move longitudinally along the inner tube 11 and shorten legs 102 by the weight of the accessory pushing downward on the tubes. Stops at the upper ends of the first and second tubes may prevent the outer tube 12 from sliding off tube 11. Extension locks on tube 13 when present may be opened to allow retraction of tube 12 within tube 13.

Figure 5A:
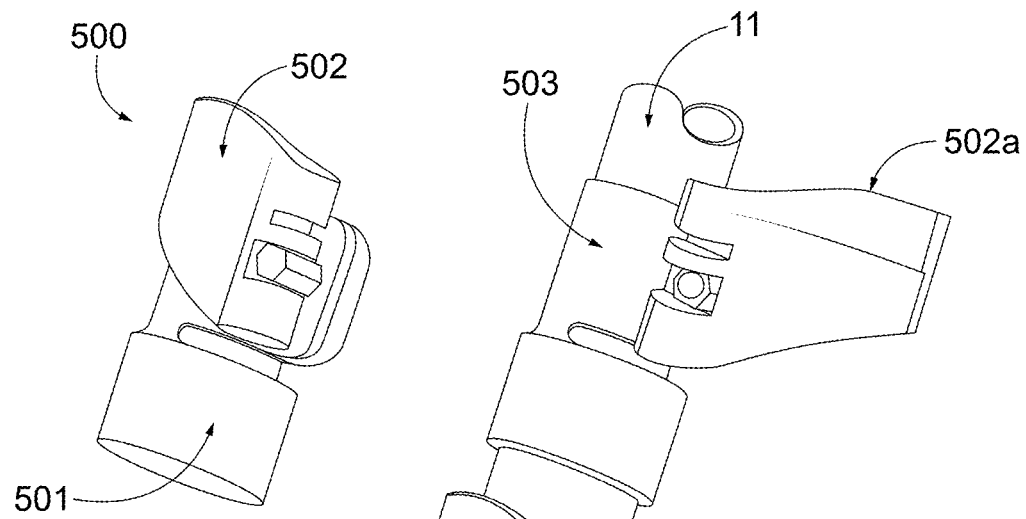
FIGS. 5A-5C show aspects of an external extension lock according to an embodiment of the disclosed subject matter.
Figure 5B:
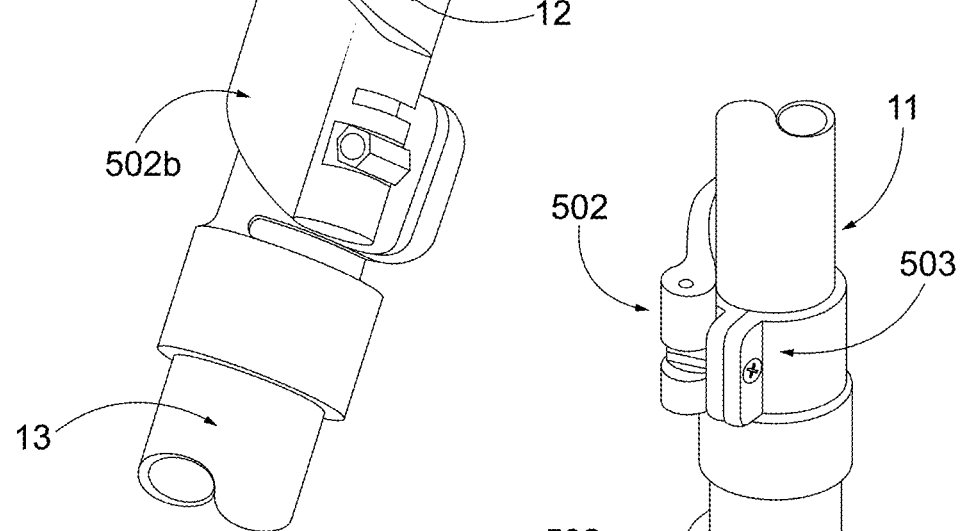
Figure 5C:
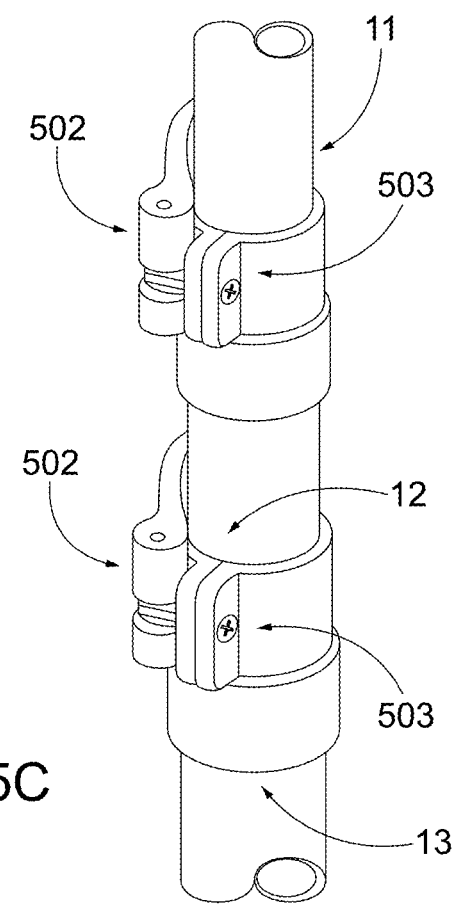

As shown in FIGS. 5A to 5C, the legs 10 may comprise external extension locks such as 500 (FIG. 5A). As shown in FIG. 5B, the extension locks 500 are configured as end caps 501 on the upper end of second tube 12 and the upper end of the optional third tube 13, if present. The extension lock 500 comprises a lever 502 that can pivot to tighten (position 502a) or loosen (position 502b) a tubular extension 503 of the lock 501 around the smaller tube. When tightened, the lock prevent movement of the tubes relative to each other. For example, an external extension lock on the upper end of the outer tube 12 may be disengaged to allow extension control to be dependent on the release lock mechanism 170 or 470. After the extension of outer tube 12 relative to inner tube 11 is determined using the method described above, the extension lock can be tightened to ensure that the extension cannot be changed by inadvertent pulling of trigger 31. FIG. 5C shows an opposite view of the extension locks 500 shown in FIG. 5B.

Figure 6:
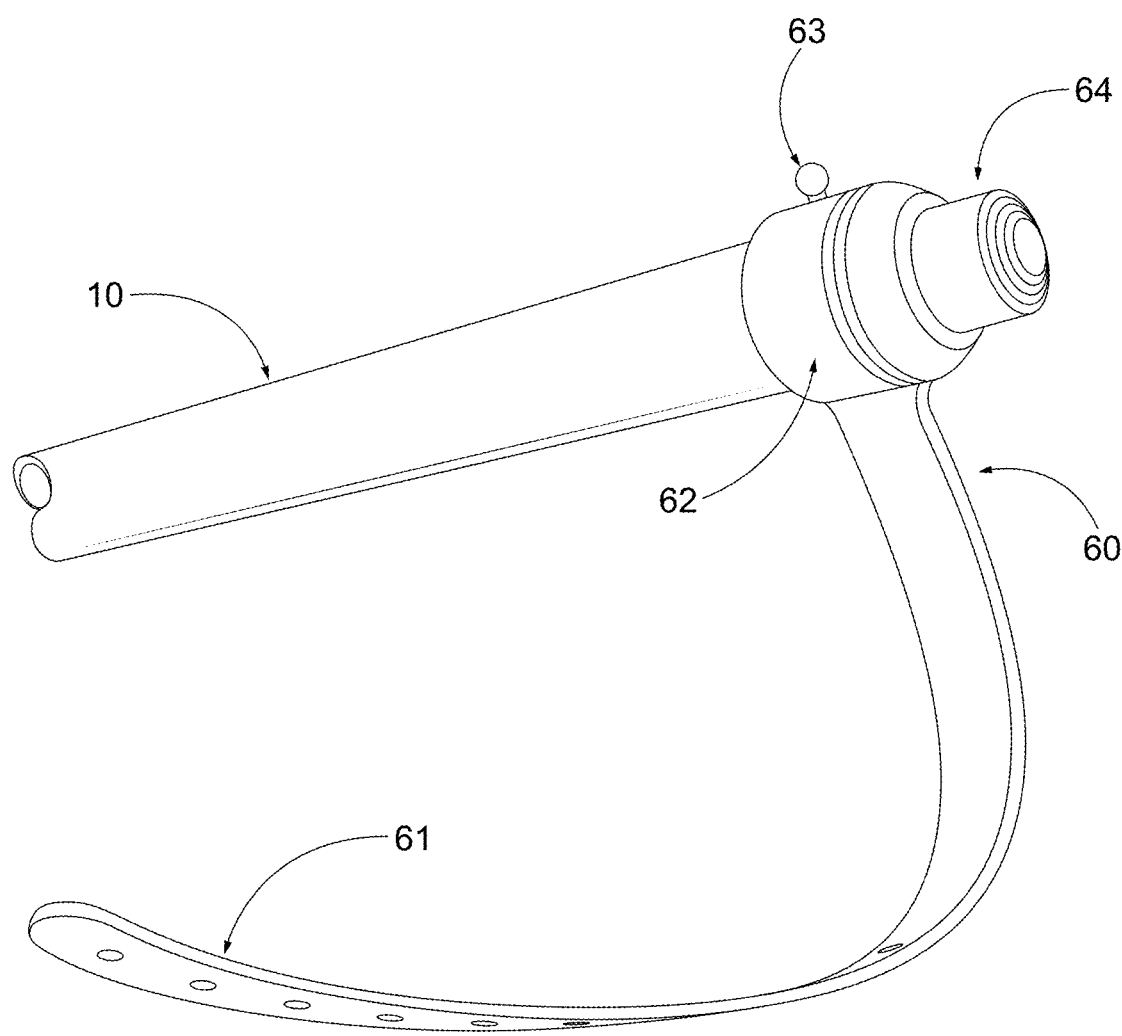
FIG. 6 shows a view of an optional strap for a stand according to an embodiment of the disclosed subject matter.

FIG. 6 (see also FIG. 4B) shows a close-up view of an optional strap configured to wrap around the lower ends of the legs of the stand when they are in a closed position. Strap 60, comprising one or a plurality of holes 61 can be disposed at the lower end of one of the legs 10. Collar 62 can be disposed around one leg 10 to position the strap. Projection 63 on collar 62 is configured to releasably engage a hole 61 on the strap 60. In some embodiments as shown, collar 63 and foot pad 64 or end cap 220 are separate members; in other embodiments collar 63 may be integrated with a foot pad 64 or end cap 220. In embodiments, strap 60 may comprise an elastomeric material. Alternatively, the strap may have other closure types such as complementary hook and loop segments, or magnet(s) and ferrous material, on the strap 60 and collar 62.

According to some embodiments an accessory mounting assembly may be an accessory mounting assembly configured to mount to the forward end of a weapon such as a rifle, crossbow, compressed-air gun, or other type of firearm or gun. Other accessory mounts may be used as described further herein.

Figure 7A:
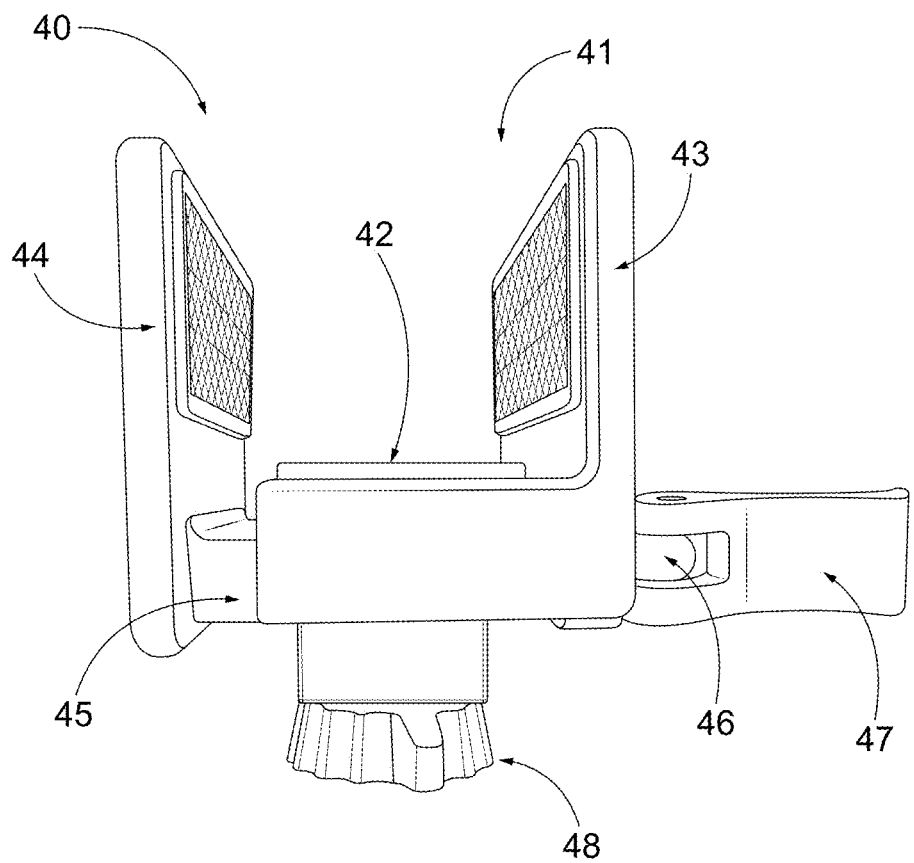
FIGS. 7A and 7B show perspective close-up views of a gun mount for engagement to the stand according to an embodiment of the disclosed subject matter.
Figure 7B:
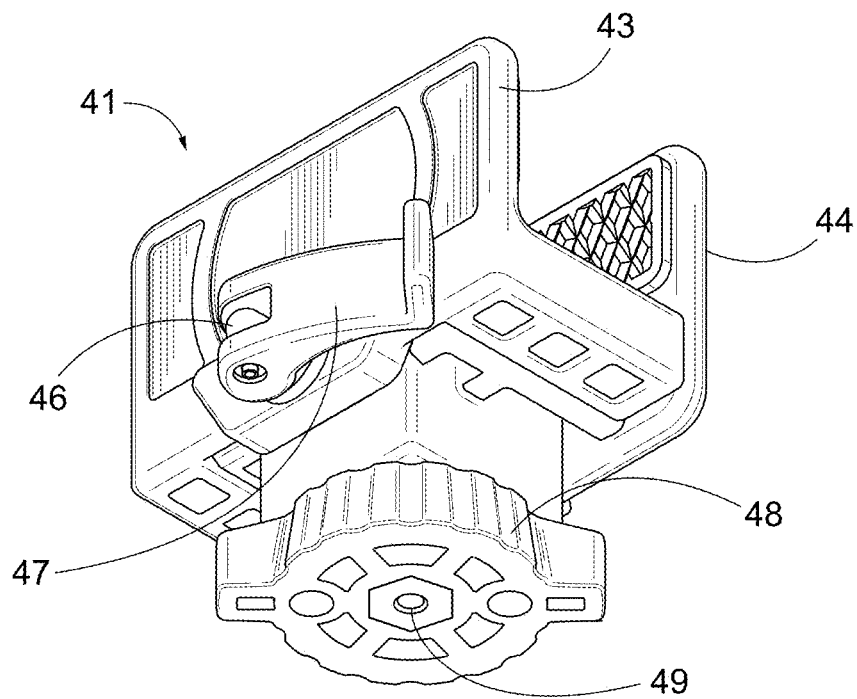

FIGS. 7A and 7B show close-up views of an embodiment of an accessory attachment member 40 that can be engaged to the stand 1 (see also FIG. 2B). The embodiment of the accessory attachment member shown is a gun mount 41, but that is not limiting. The gun mount 41 comprises a platform 42 with a slot therein and a first wall 43 disposed perpendicular to the platform 42. A second wall 44 opposed to the first wall comprises a perpendicular flange 45 configured to slidingly engage the slot and move the second wall 44 relative to the first wall 43. A post 46 on the flange 45 extends through an opening in the platform 42 to engage a locking lever 47 configured to selectively release or lock the flange 45 in the slot to clamp the gun (rifle) in the gun mount. In FIG. 7A, the locking lever 47 is shown in it unlocked position. A mounting ring 48 on the bottom of the mount is configured to engage the accessory post 22 of the connection housing 20 via hole 49 on the bottom of ring 48 as shown in FIG. 7B. In FIG. 7B, the locking lever 47 is shown in it locked position. The gun mount 41 is configured to swivel about a vertical axis aligned with the accessory post 22 to provide a horizontal movement of the mount and gun clamped therein. Optionally, the gun mount 41 may also be configured to pivot about an axis orthogonal to the vertical axis (not shown).

Figure 8:
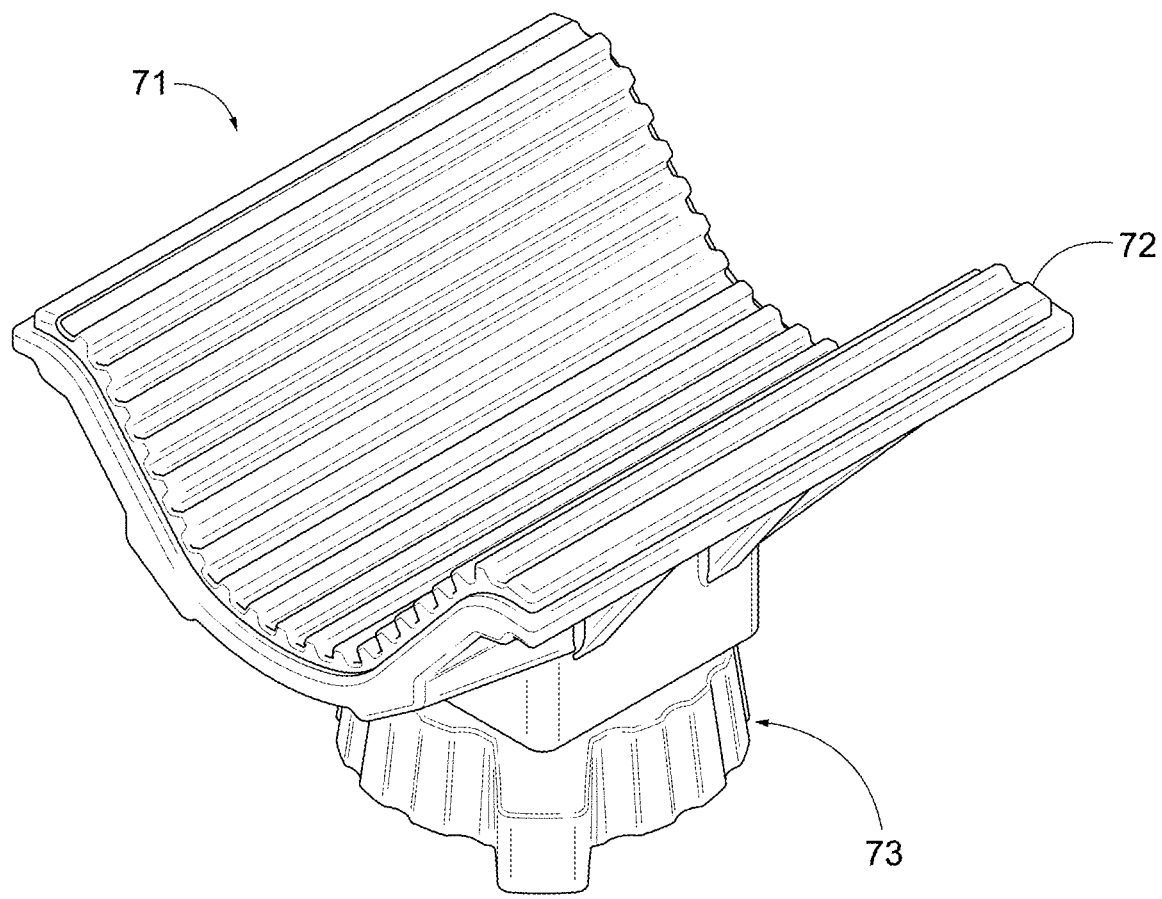
FIG. 8 shows a perspective close-up view of a gun rest for engagement to the stand according to an embodiment of the disclosed subject matter.

FIG. 8 shows a perspective close-up view of a gun rest 71 for engagement to the stand. Gun rest 71 comprises a platform 72 with a valley defined by a generally Y-shaped cross-section of the platform 72, wherein the weapon may rest within the upper arms of the Y-shaped platform. A mounting ring 73 on the bottom of the rest 71 is configured to engage the accessory post 22 of the connection housing 20. The gun rest 71 may be configured to swivel about a vertical axis aligned with the accessory post 22 to provide a horizontal movement of the rest and gun rested therein. Because the gun is rested and not clamped in the rest, a user can move the gun within the rest to line up a shot while the gun is supported by the stand.

Figure 9A:
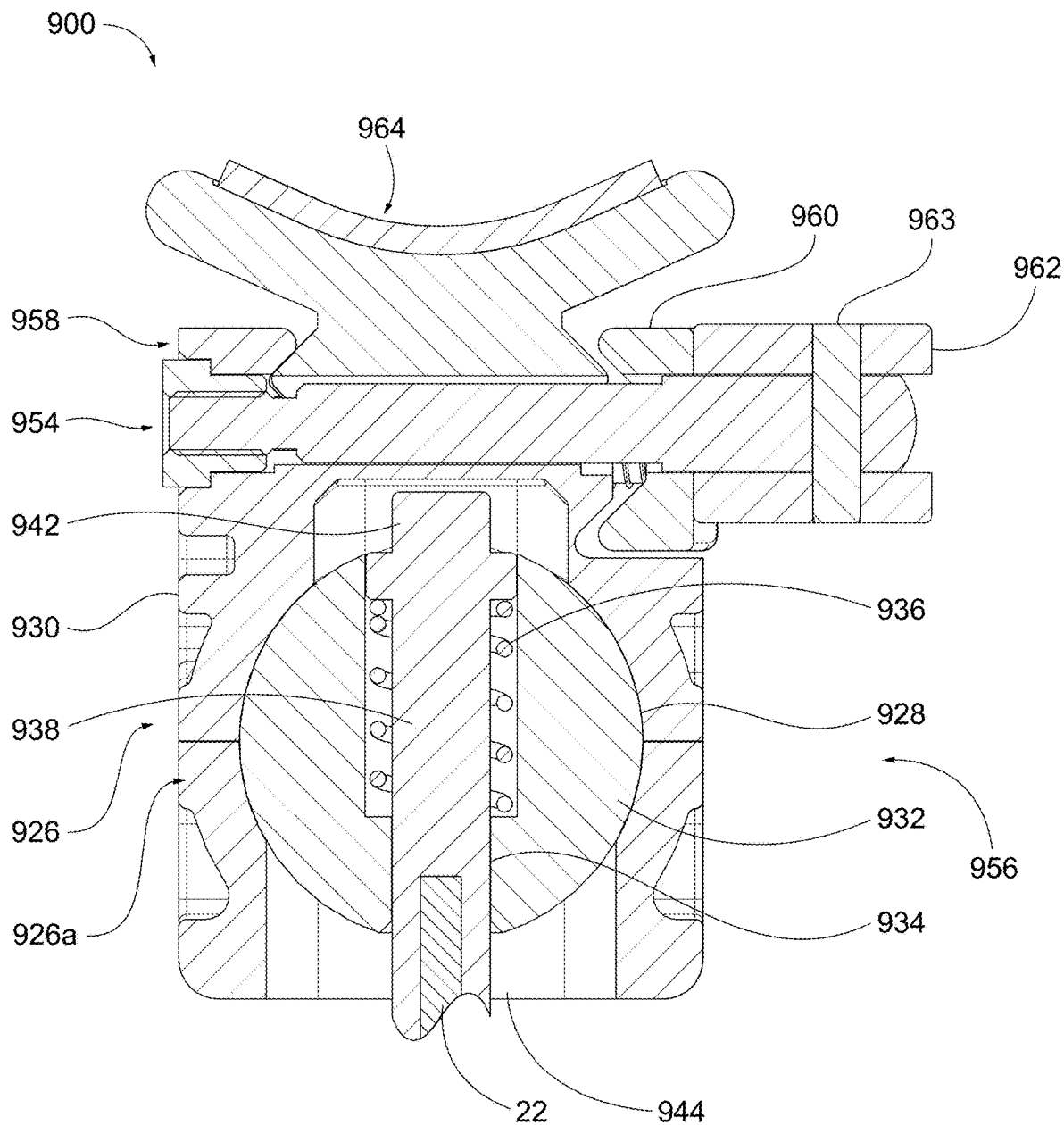
FIGS. 9A-9C show aspects of another gun mount for engagement to the stand according to an embodiment of the disclosed subject matter.
Figure 9B:
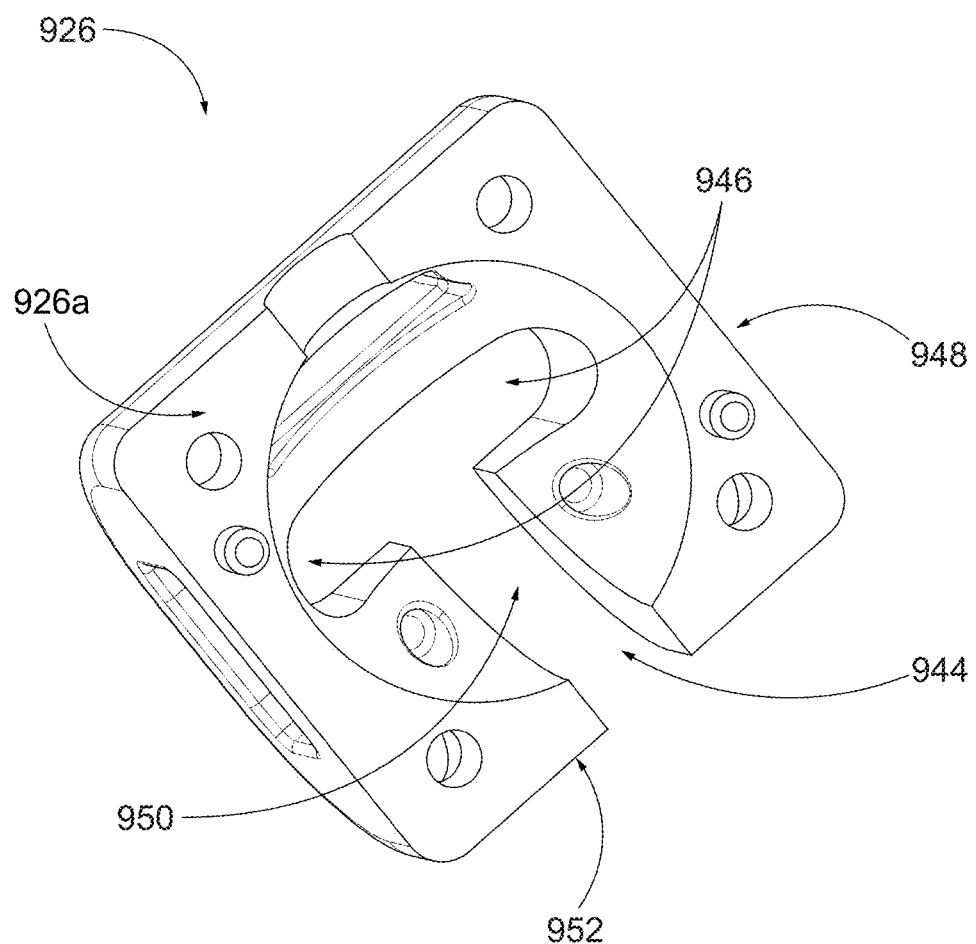
Figure 9C:
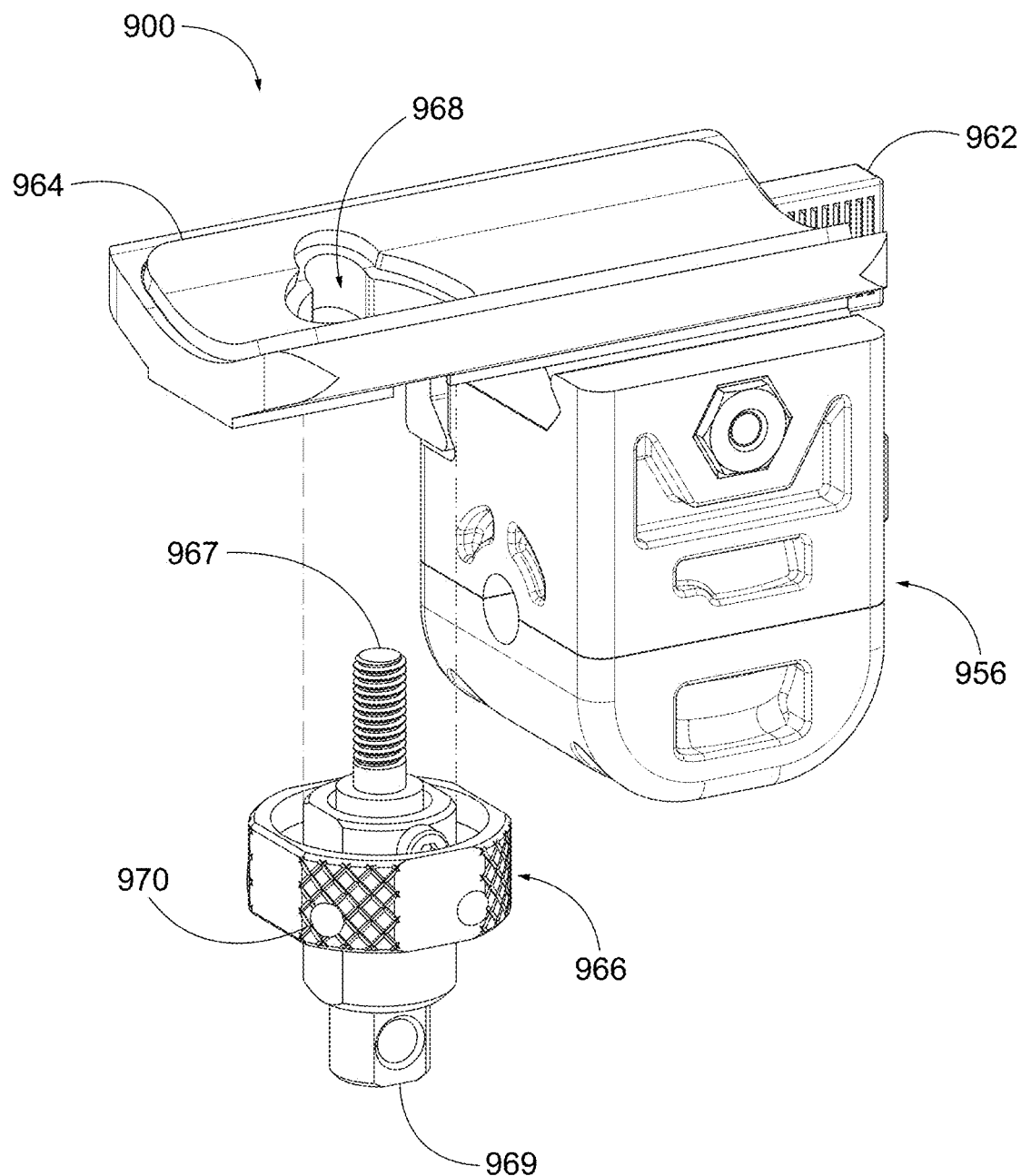

FIGS. 9A-9C show an alternative accessory mount 900. As shown in these Figures, mount 900 may comprise a Picatinny (or Weaver) rail adapter 964 and a locking lever 962.

According to some embodiments, accessory mounting assembly 900 may be rotatable in several directions relative to the telescoping support stand 1 to be folded up as a unit, to move extendable legs 10 parallel to the weapon axis. FIG. 9A shows a cross-section of the accessory mounting assembly 900 connected to stand 1 by engaging post 22 with a recess in the bottom end 940 of ball joint rod 938. In embodiments the recess may comprise inner screw threads to engage outer screw threads on post 22. In various embodiments, accessory mounting assembly 900 includes an accessory mounting assembly housing 926 having an internal socket 928 and a ball joint 930 comprising a ball 932 housed within the internal socket 928. Ball 932 includes a bore 934 extending through ball 932. A helical spring 936 is disposed within bore 934. A ball joint rod 938 is disposed within the helical spring 936 within bore 934. Ball joint rod 938 may be configured for biased movement relative to bore 934. Ball joint rod 938 has an upper end 942 having a greater diameter than bore 934 such that upper end 942 is configured to be blocked from passing through bore 934. In some embodiments as shown in FIG. 9B, a lower portion 926a of the accessory mounting assembly housing 926 has a curved T-shaped slot 944 extending along two sides such that the cross legs 946 of the T-shaped slot 944 extends across a bottom 948 of the accessory mounting assembly housing 926 and the center leg 950 of T-shaped slot 944 extend along a side 952 of the accessory mounting assembly housing 926. To rotate the accessory mounting assembly 900 relative to connection housing 20, a user pulls up on the accessory mounting assembly 900 relative to connection housing 20 which compresses spring 936 within bore 934 allowing movement of accessory mounting assembly 900 by rotating about the axis of ball joint rod 938 and/or allowing ball joint rod 938 to follow the path of T-shaped slot 944.

In other embodiments (not shown), the accessory mounting assembly housing 926 may have a spring loaded-pin that contacts a ball 932 to hold it in place. To rotate the accessory mounting assembly, a user may pull the spring-loaded pin away from the ball so that it is free to rotate within the internal socket 928 and then release the spring loaded pin to contact the ball 932 to hold it in its new position.

According to some embodiments, the top 954 of accessory mounting assembly 900 includes a weapon or gun mount 956 which is configured to mount to a gun, for example. Gun mount 956 may be configured to mount to a swivel stud or a Picatinny rail or Weaver rail attached to the gun. In some embodiments, gun mount 956 includes a fixed rail 958 and a spaced parallel movable rail 960 which is movable toward and away from fixed rail 958 in order to clamp onto a gun's Picatinny rail. Movable rail 960 may have a locking lever 962 pivotally attached thereto to lock the position of movable rail 960 relative to fixed rail 958 by pivot connection 963.

According to some embodiments, when a gun does not have a Picatinny rail, a Picatinny rail adapter 964 may be mounted to the gun mount 956 rails 958, 960 by a threaded locking nut 966 (FIG. 9C). In some embodiments, Picatinny rail adapter 964 may be a V-shaped or U-shaped trough and have a through hole 968 for mounting to a swivel stud on the gun with the locking nut 966, which may include radial through holes 970 configured to receive set screws to clamp on to the swivel stud comprising threaded rod 967 on the gun. Rod 967 is not normally removed from the gun but is shown here removed from the gun to allow ease of presentation. Nut 966 is configured to engage rod 967 from below when the swivel stud is passed through hole 968 from above. Alternatively, the nut may be engaged to a threaded rod 967 as shown that can engage an internally threaded socket on the underside of an accessory to attach the accessory (e.g. a weapon) to the mount. Nut 966 also comprises a post with a transverse through hole 969. Gun mount 956 may be shaped to allow a shooter to support the forward end of the weapon or gun, for example, while the shooter is shooting and to continue to attach to the gun when not in use.

It should be appreciated that the accessory mounting assembly 900 may comprise an accessory mount other than mount 956 illustrated herein. In embodiments, the mounting assembly comprises an alternative mount other than mount 956 attached to the top 954 of the mounting assembly 900 comprising the ball and socket assembly described above by engaging the alternative mount to ball joint rod 938 at its upper end 942.

Figure 9D:
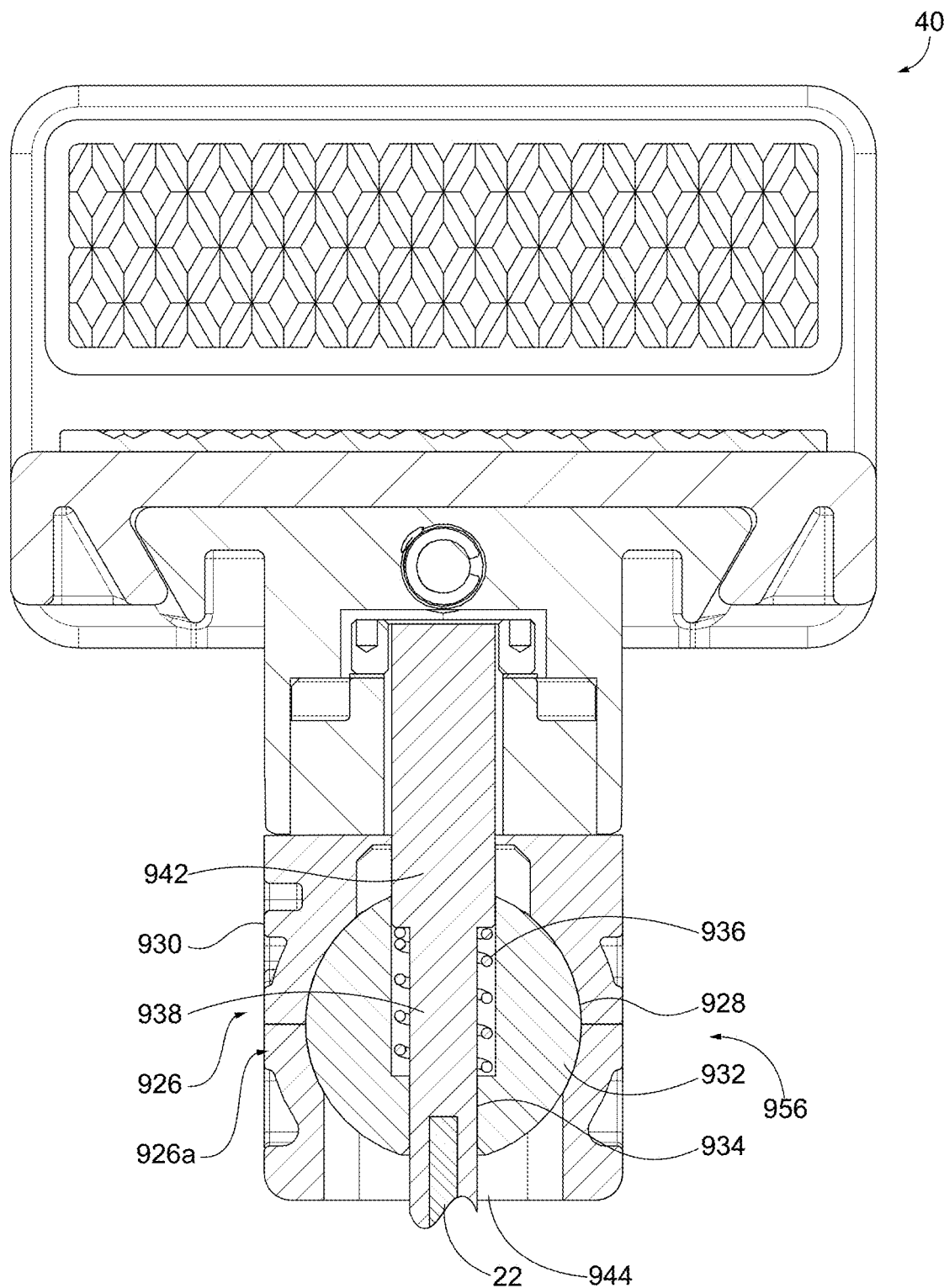
FIGS. 9D shows a cross section of another gun mount for engagement to the stand according to an embodiment of the disclosed subject matter.

For example as shown in FIG. 9D, mount 40 described above may be attached to the mount assembly 900 instead of mount 956, so that it can clamp onto a weapon that does not have a rail or swivel stud and be rotated as described above by pulling it upward from mount assembly 900. In this embodiment, mount 40 may be able to be moved about horizontal axes as well as a vertical axis relative to the stand 1.

Figure 10:
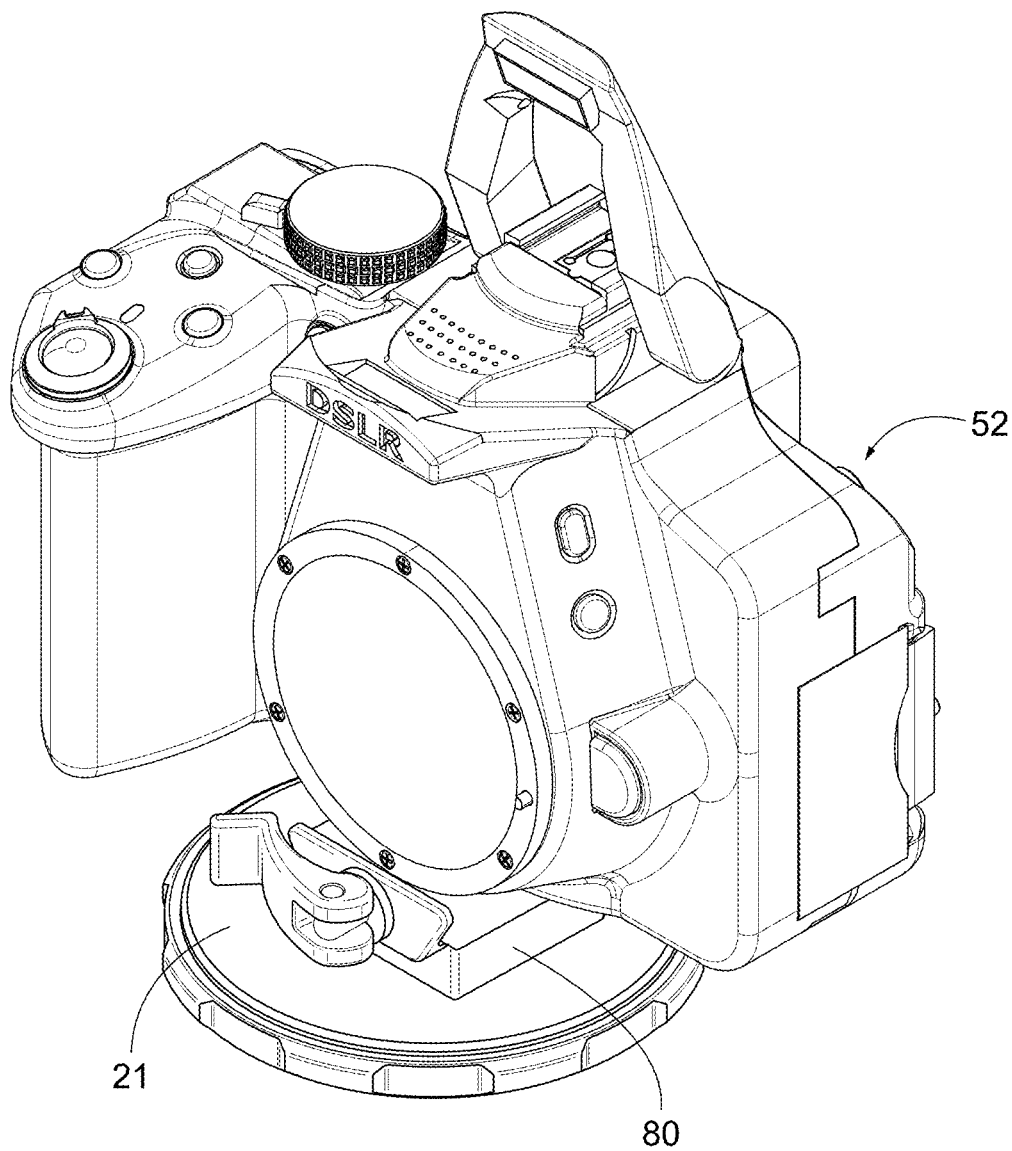
FIG. 10 shows a camera mounted on the stand according to an embodiment of the disclosed subject matter.
Figure 11:
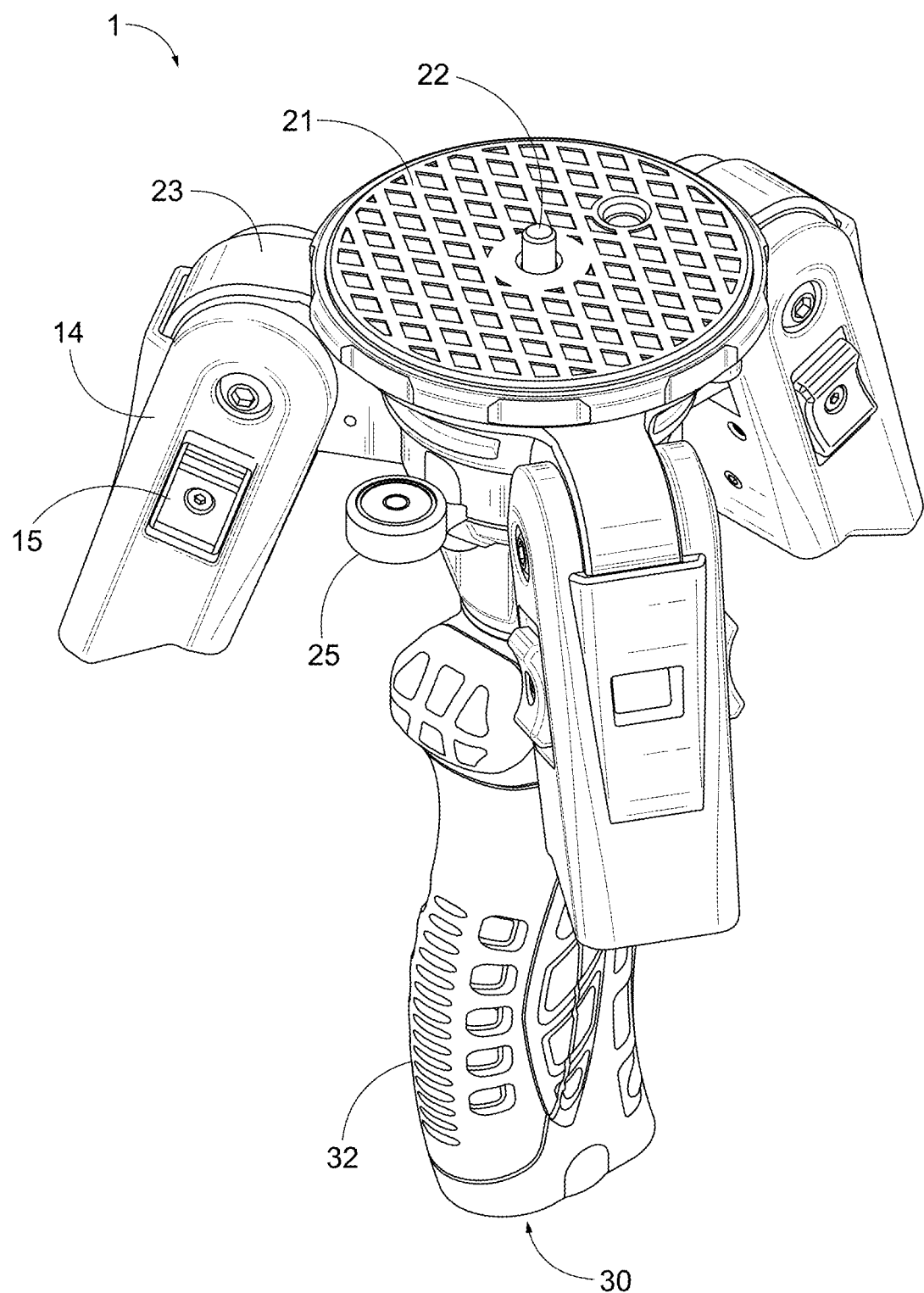
FIGS. 11-18 show views of a telescoping support stand with legs disposed in an open stance according to an embodiment of the disclosed subject matter.
Figure 12:
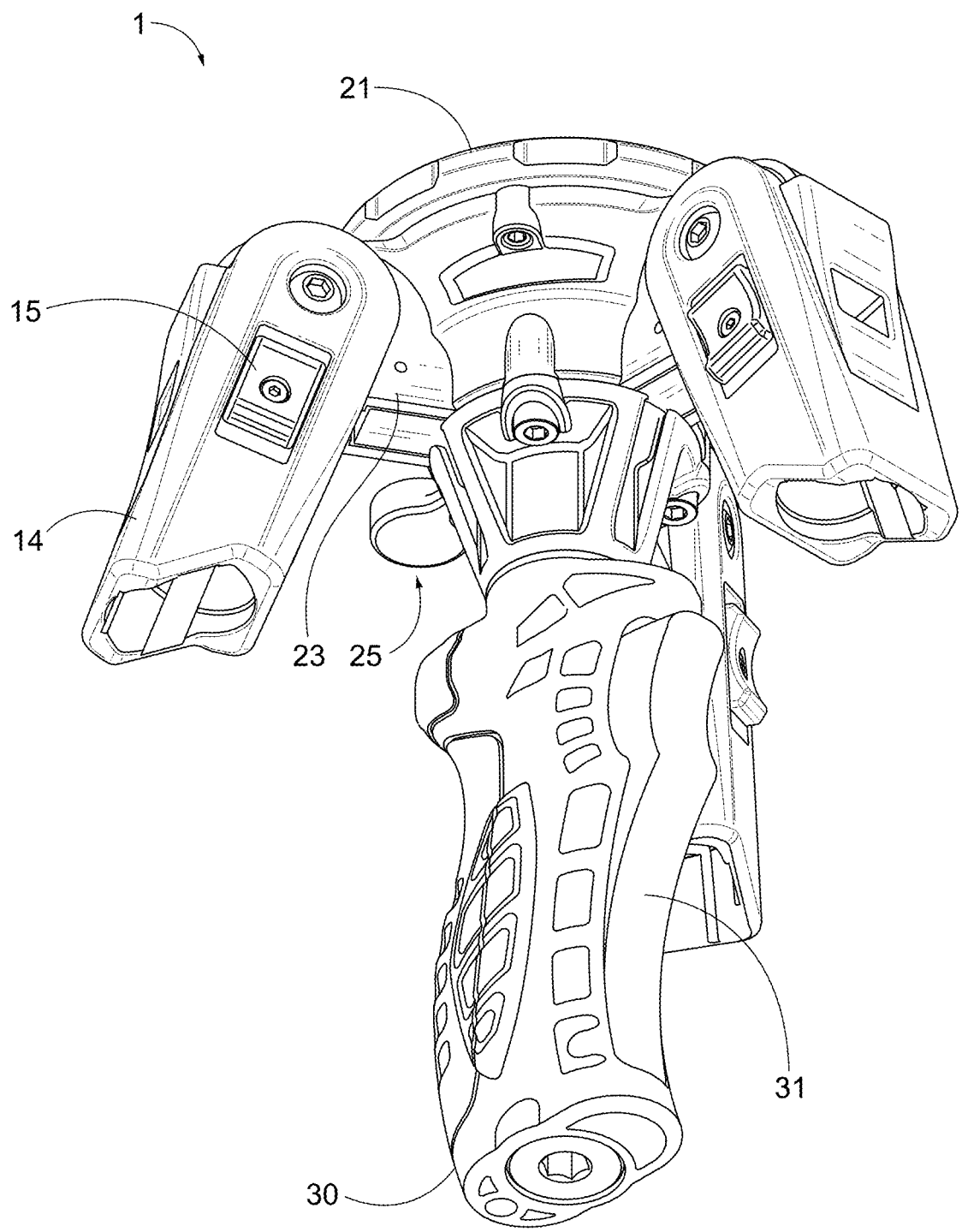
Figure 13:
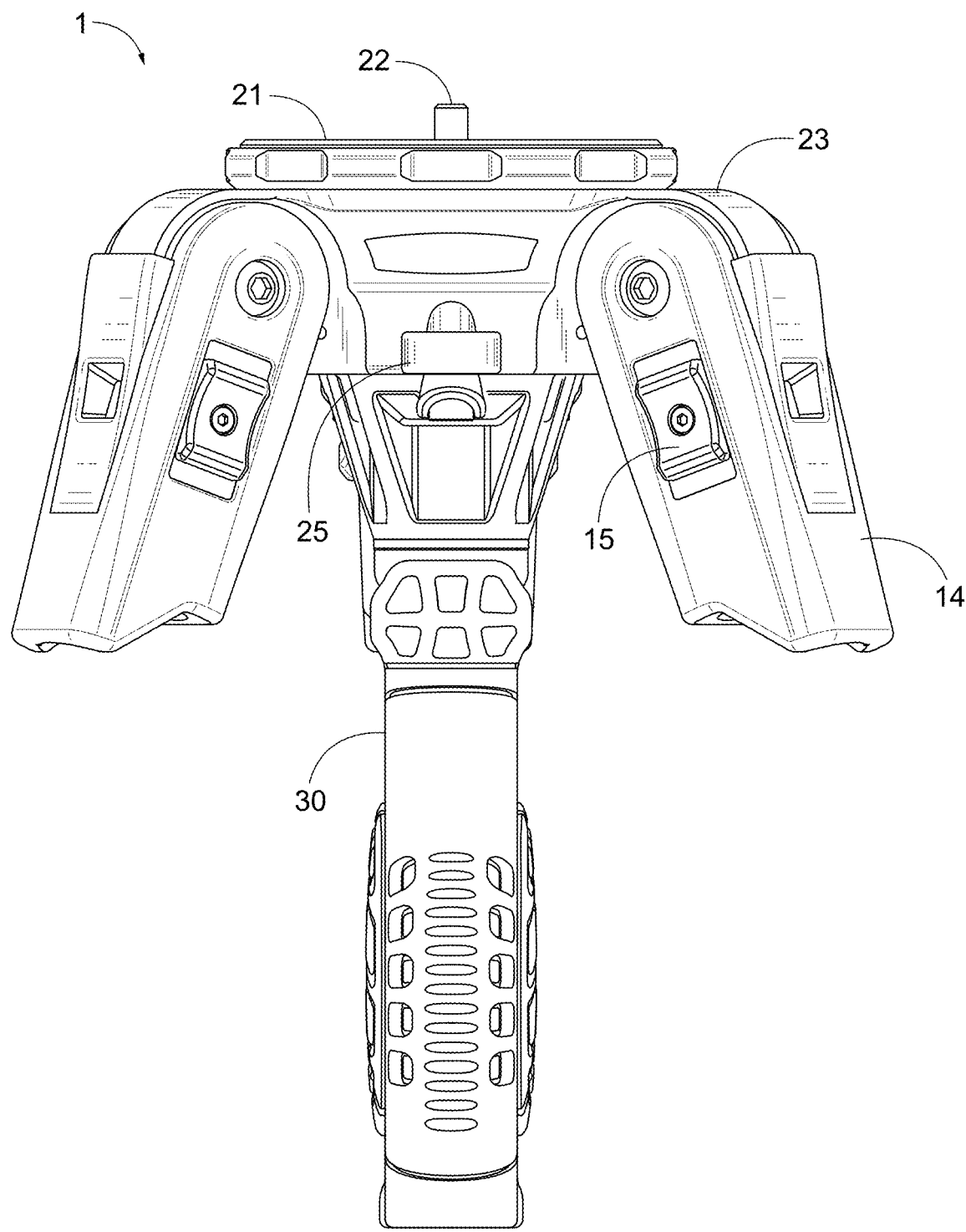
Figure 14:
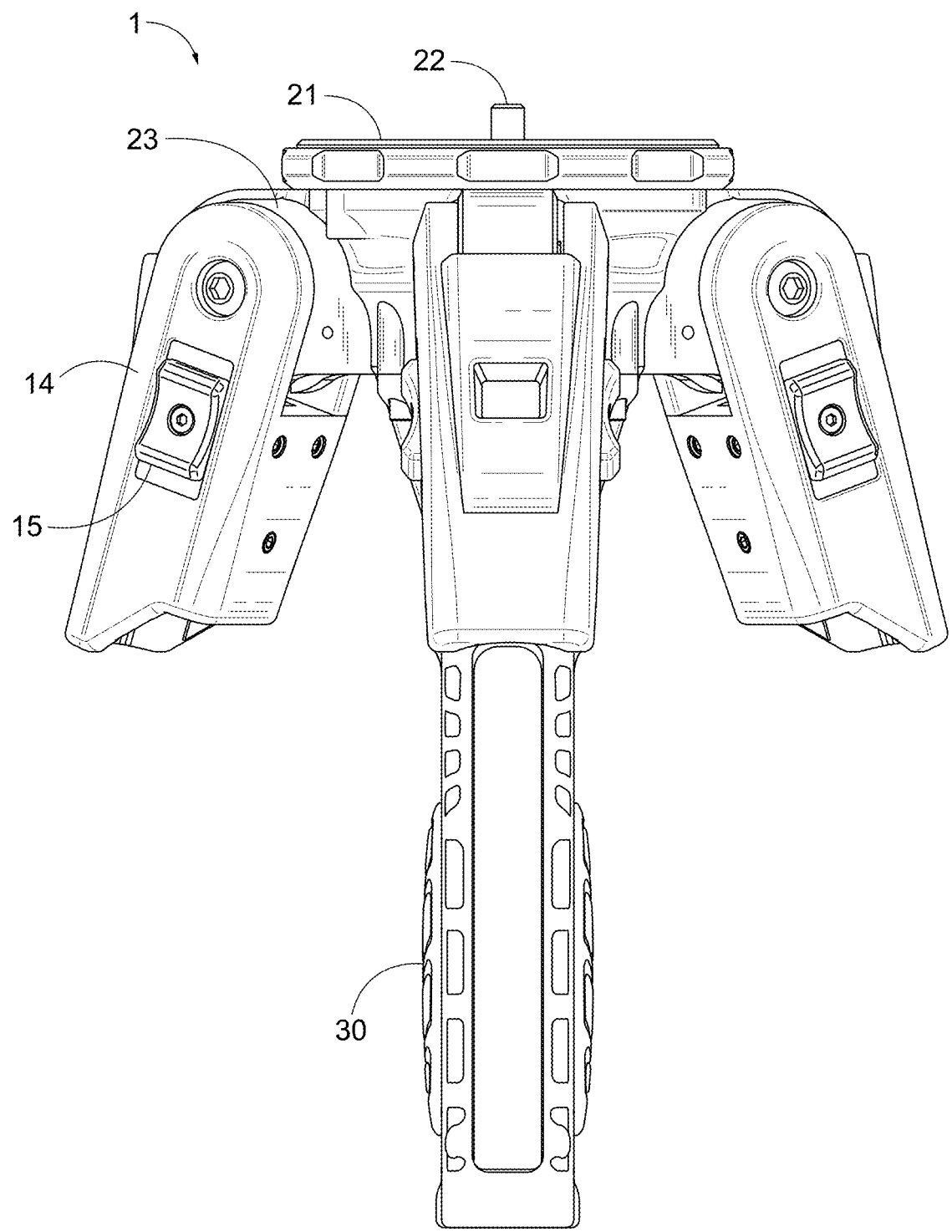
Figure 15:
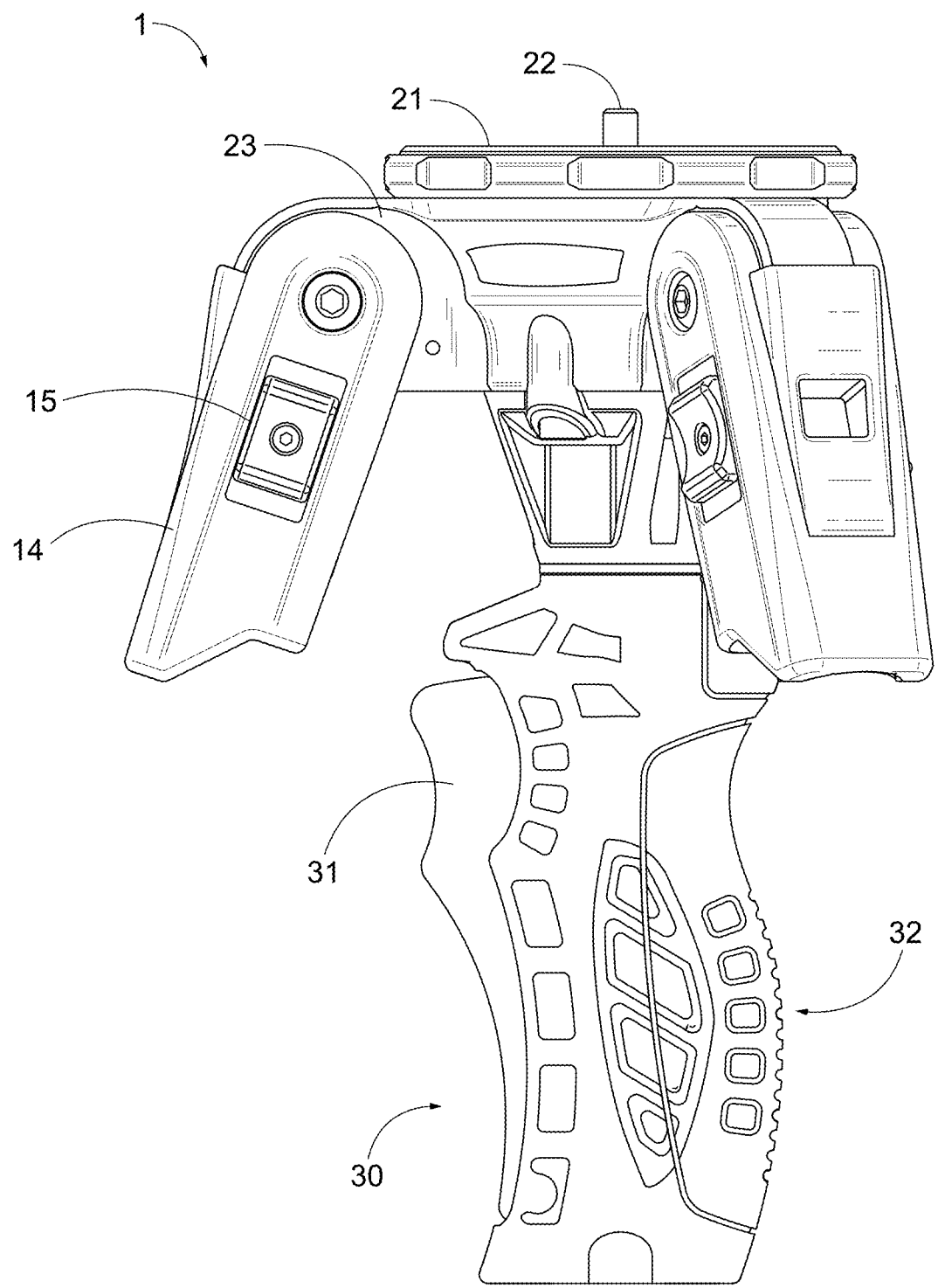
Figure 16:
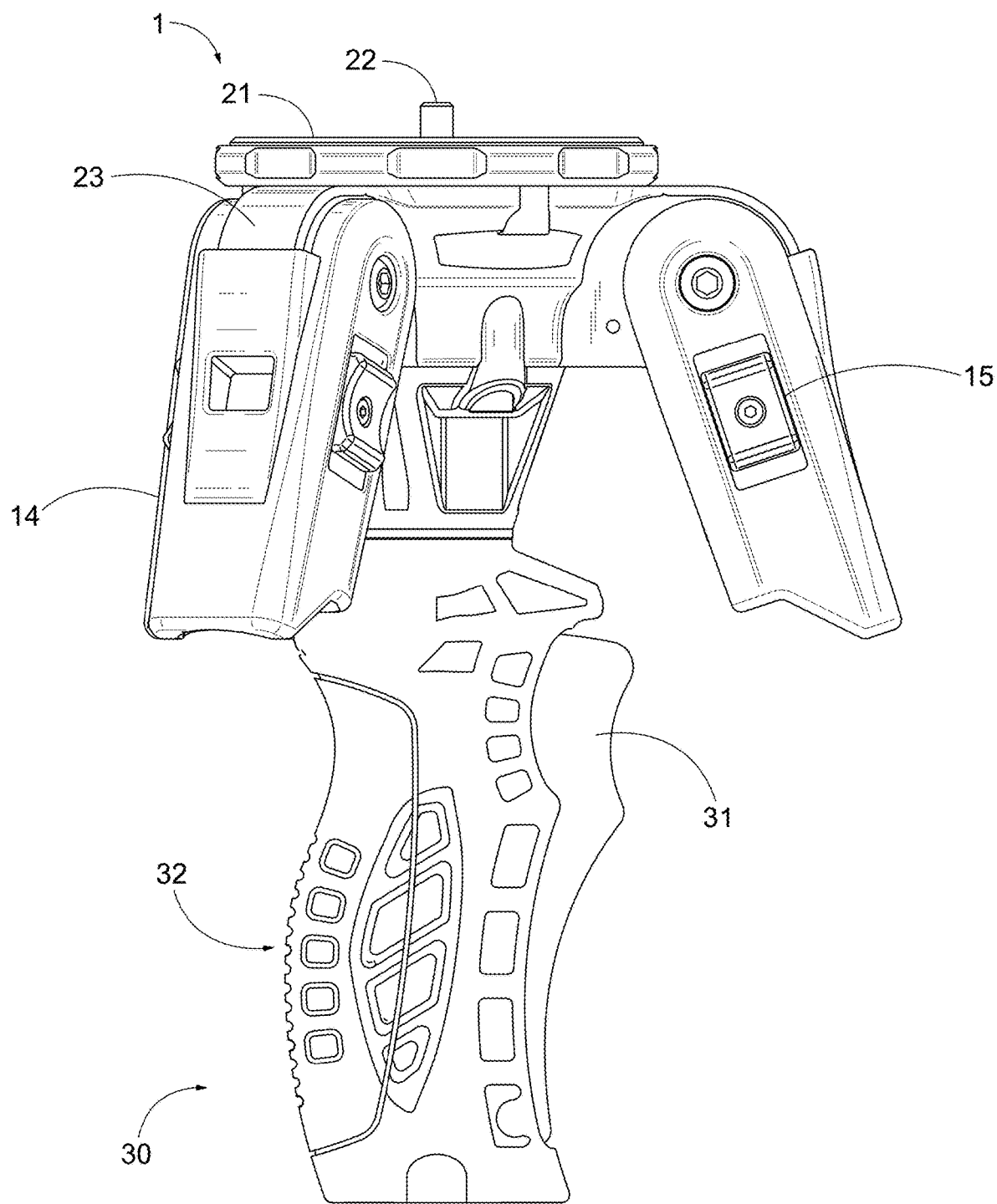
Figure 17:
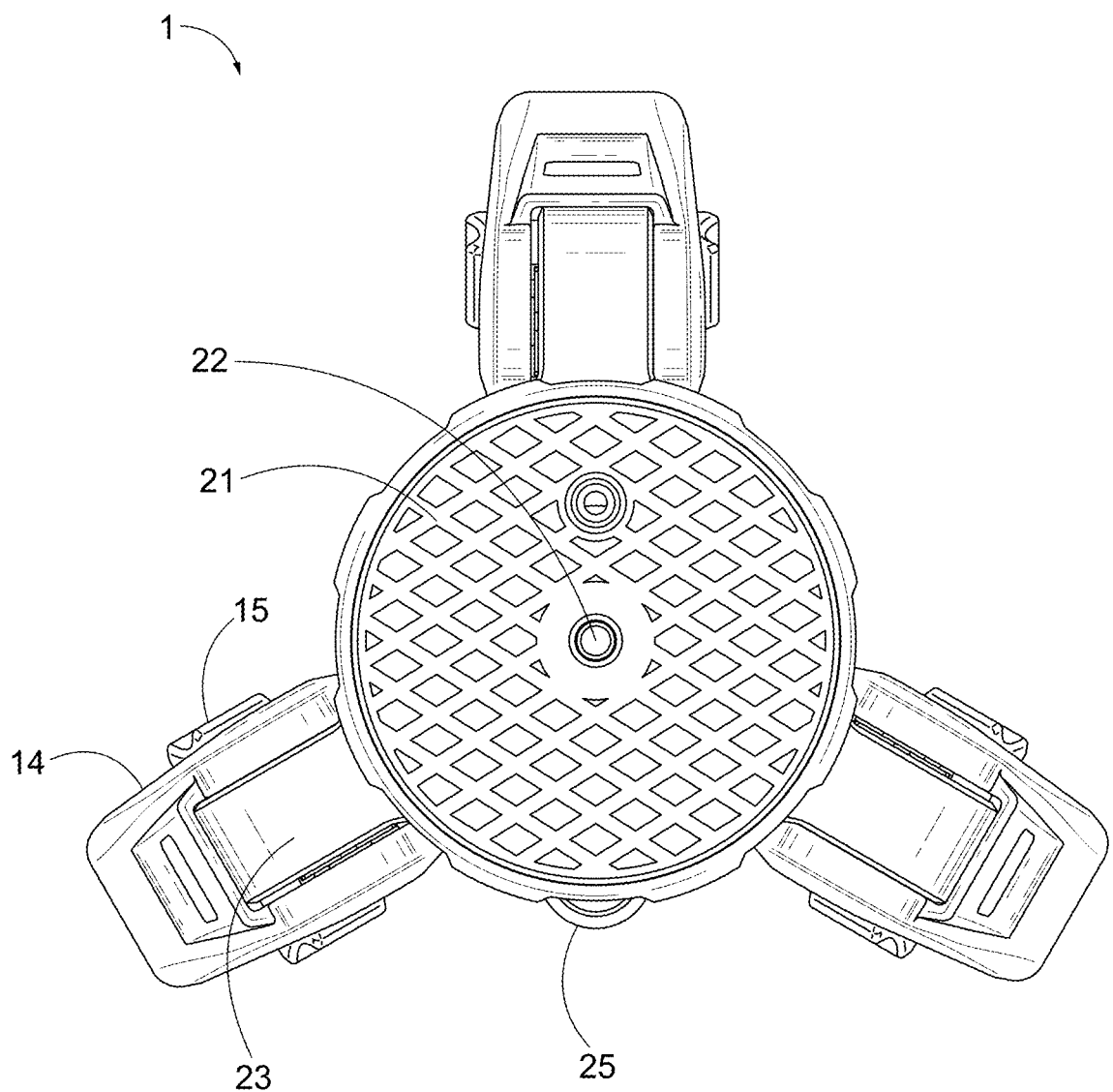
Figure 18:
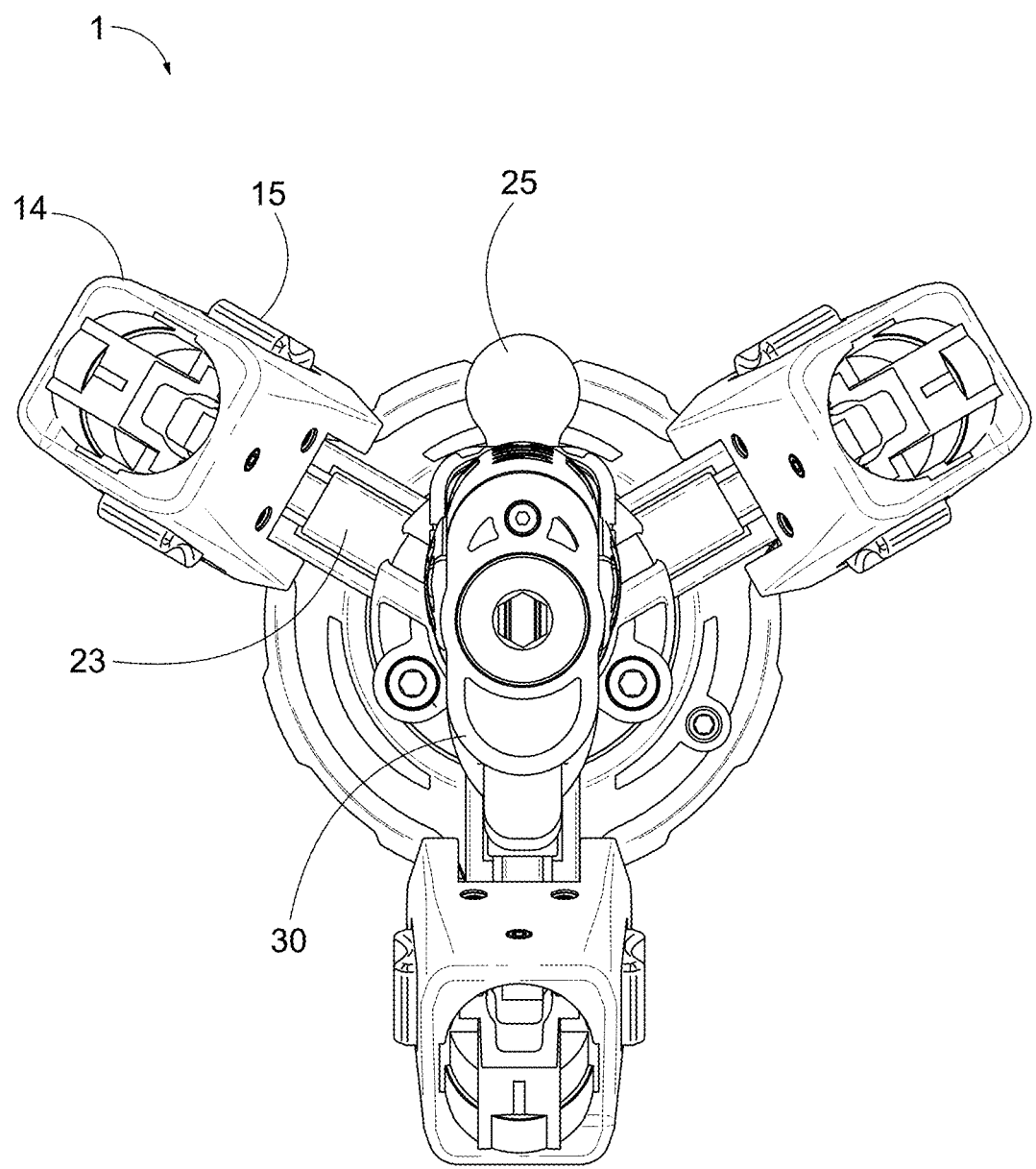
Figure 19:
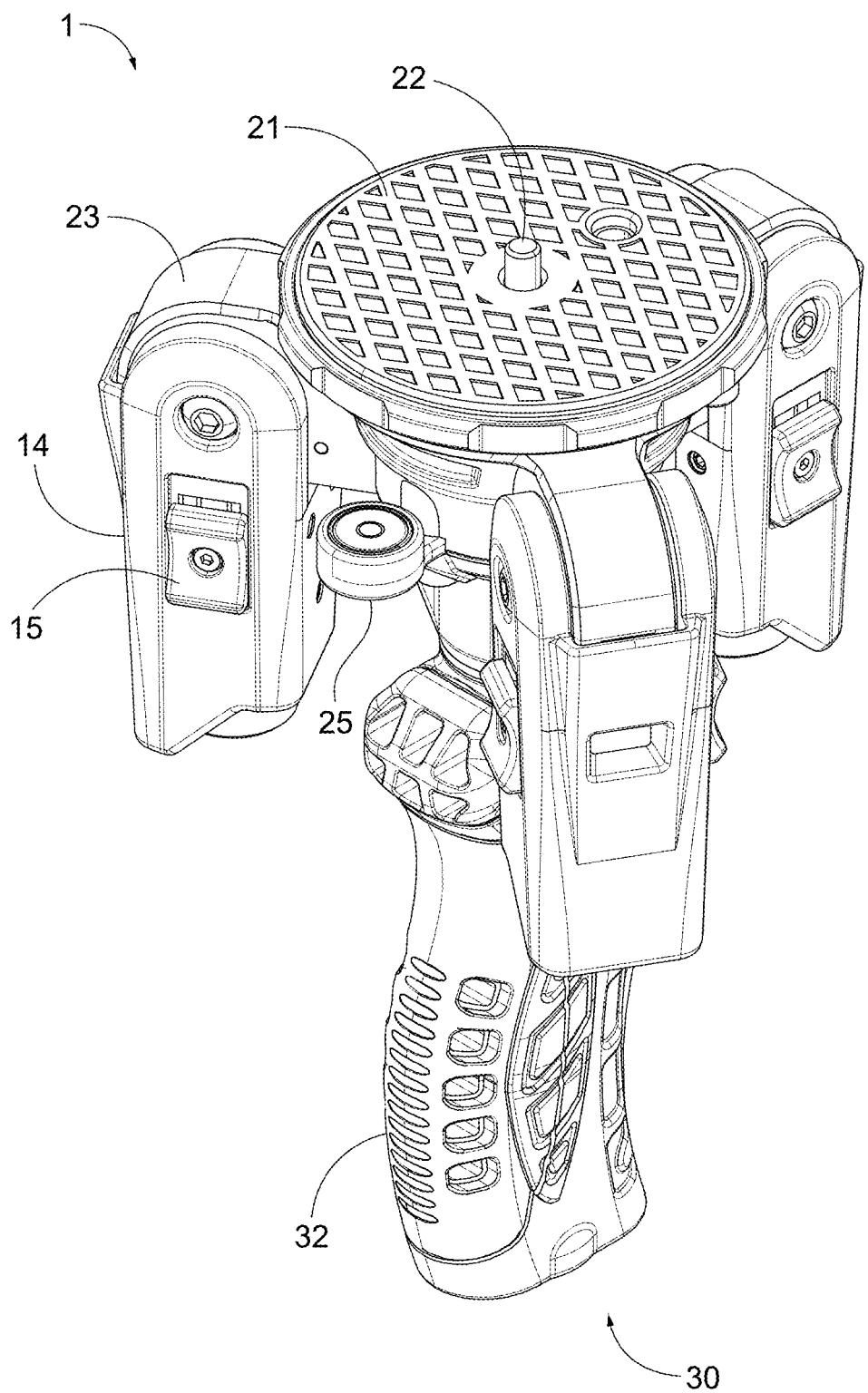
FIGS. 19-26 show views of a telescoping support stand with legs disposed in a closed stance according to an embodiment of the disclosed subject matter.
Figure 20:
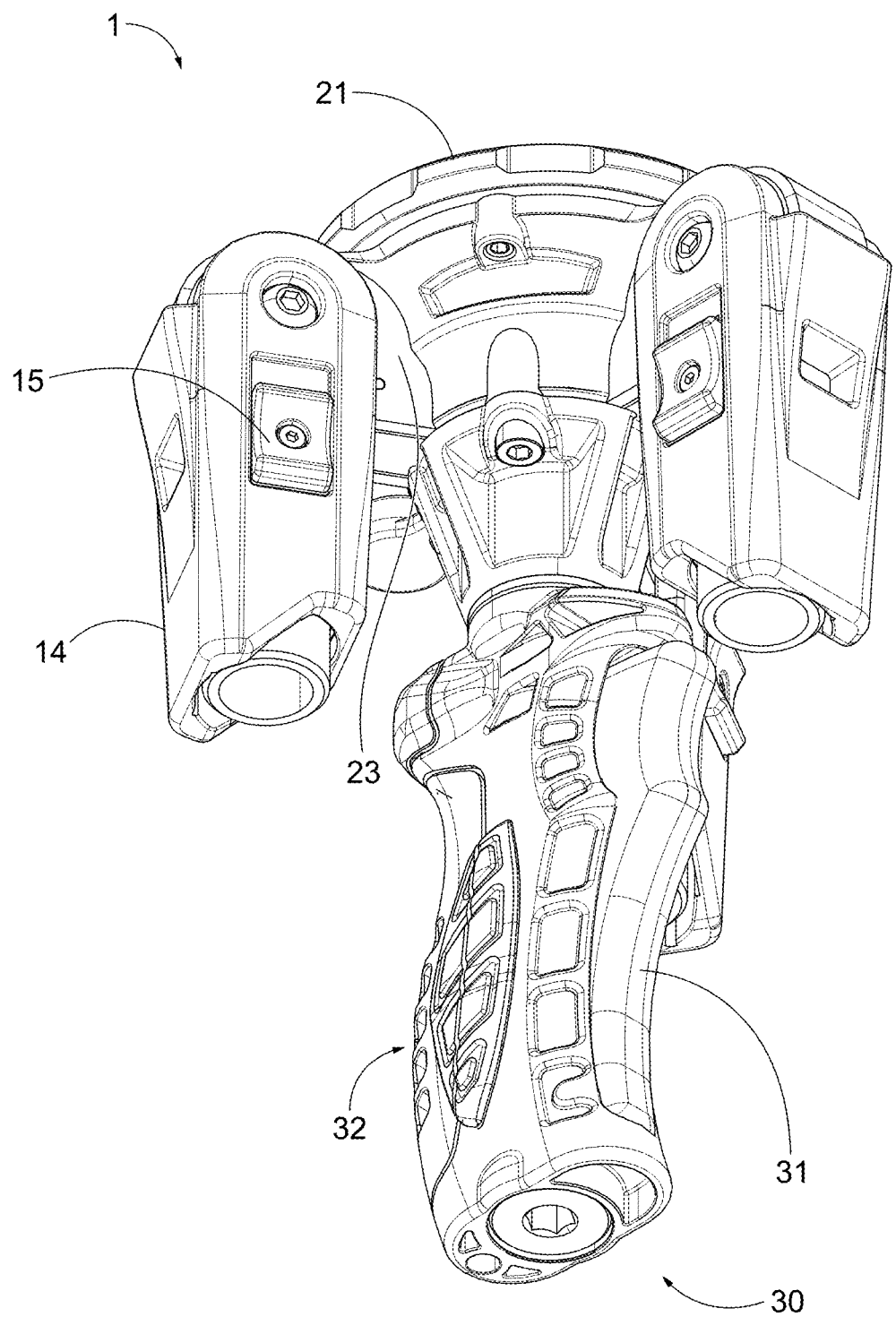
Figure 21:
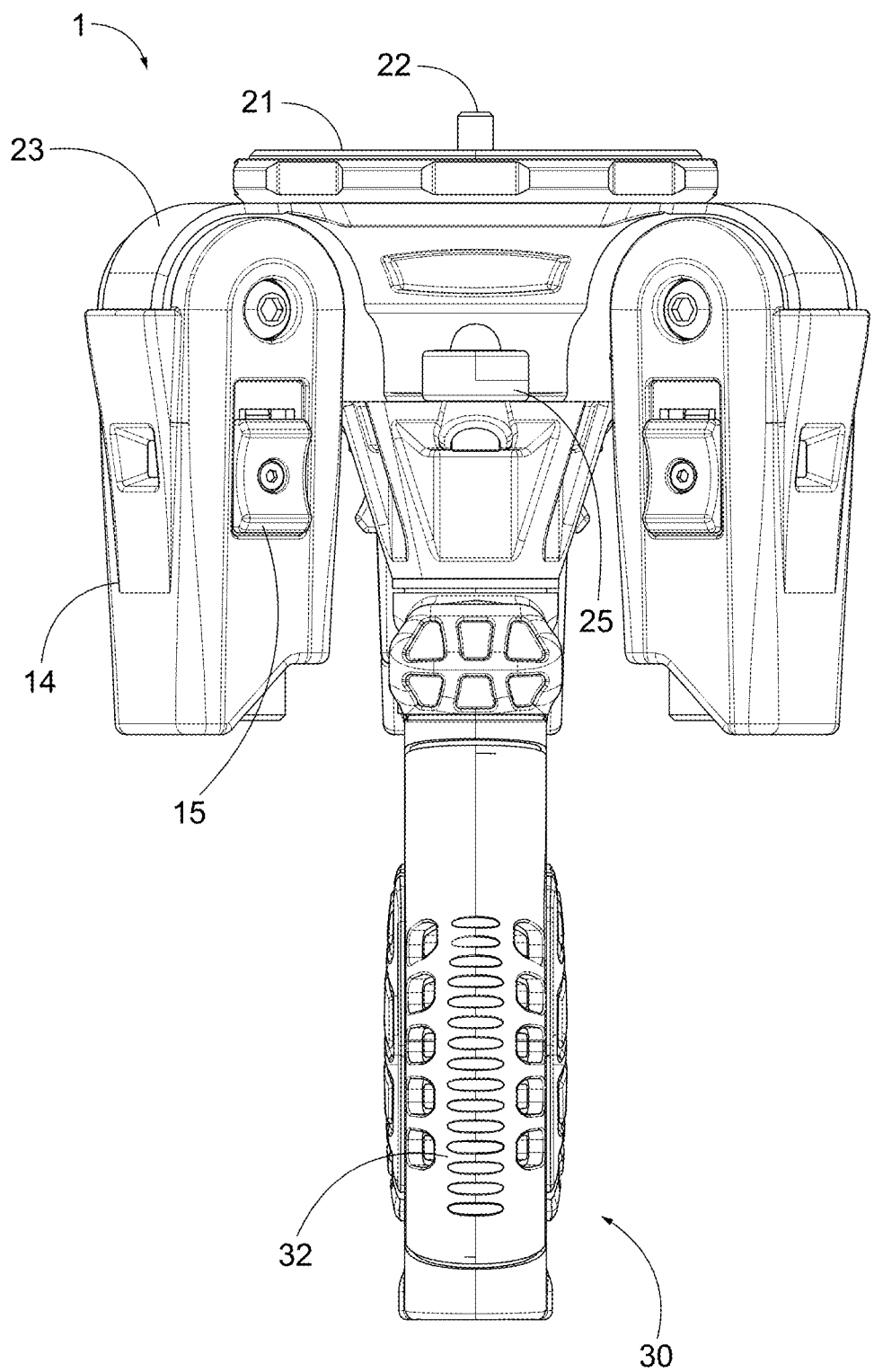
Figure 22:
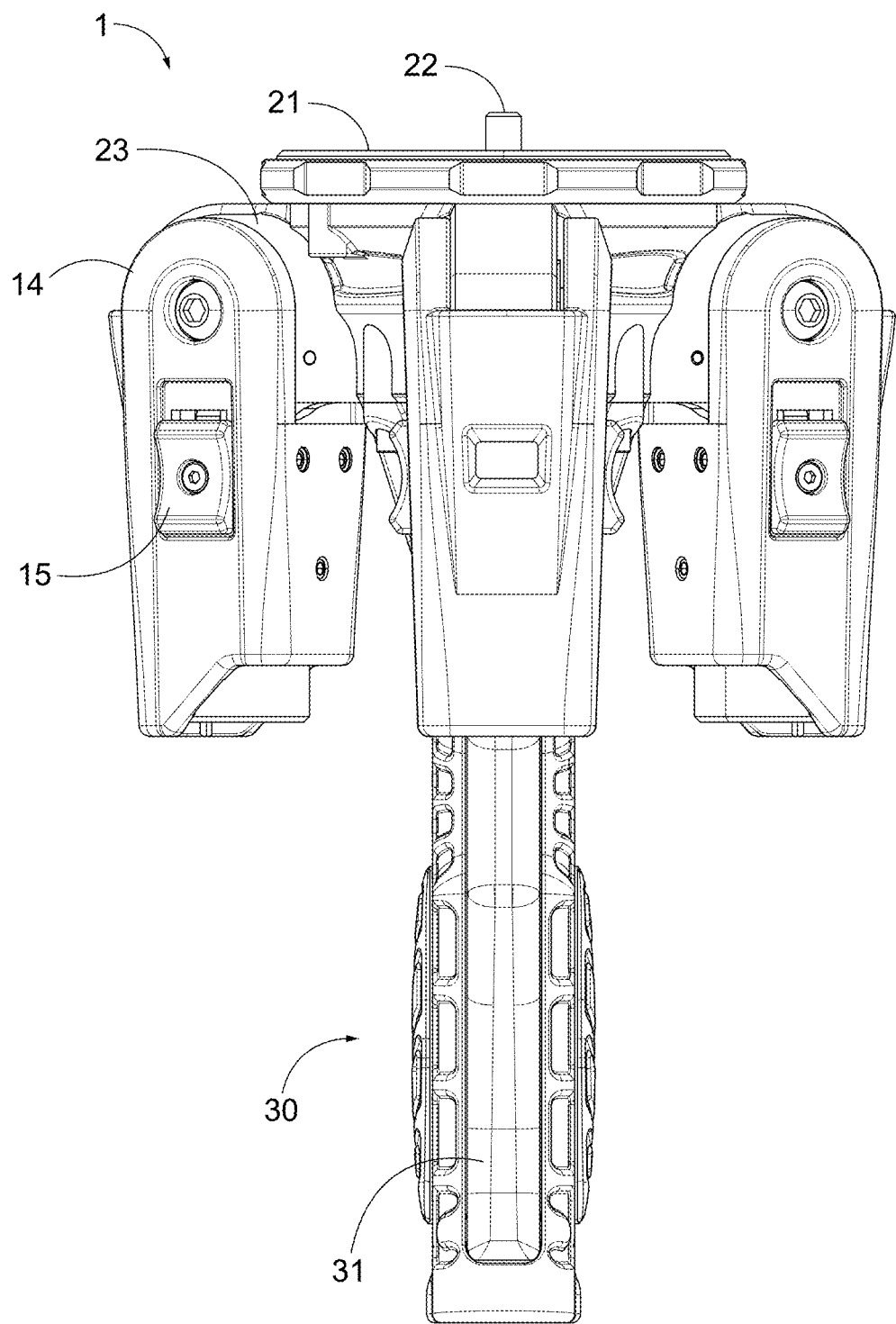
Figure 23:
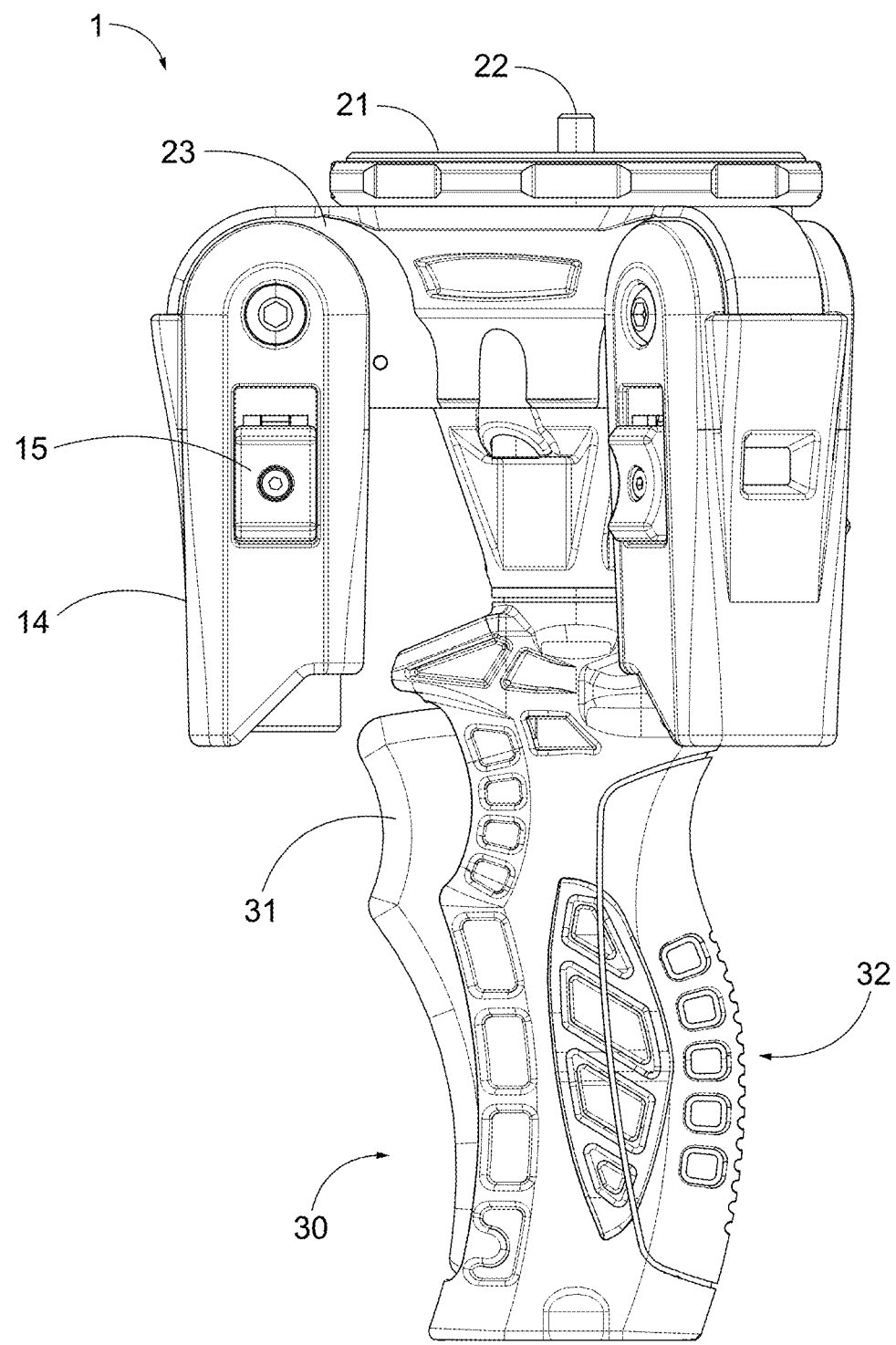
Figure 24:
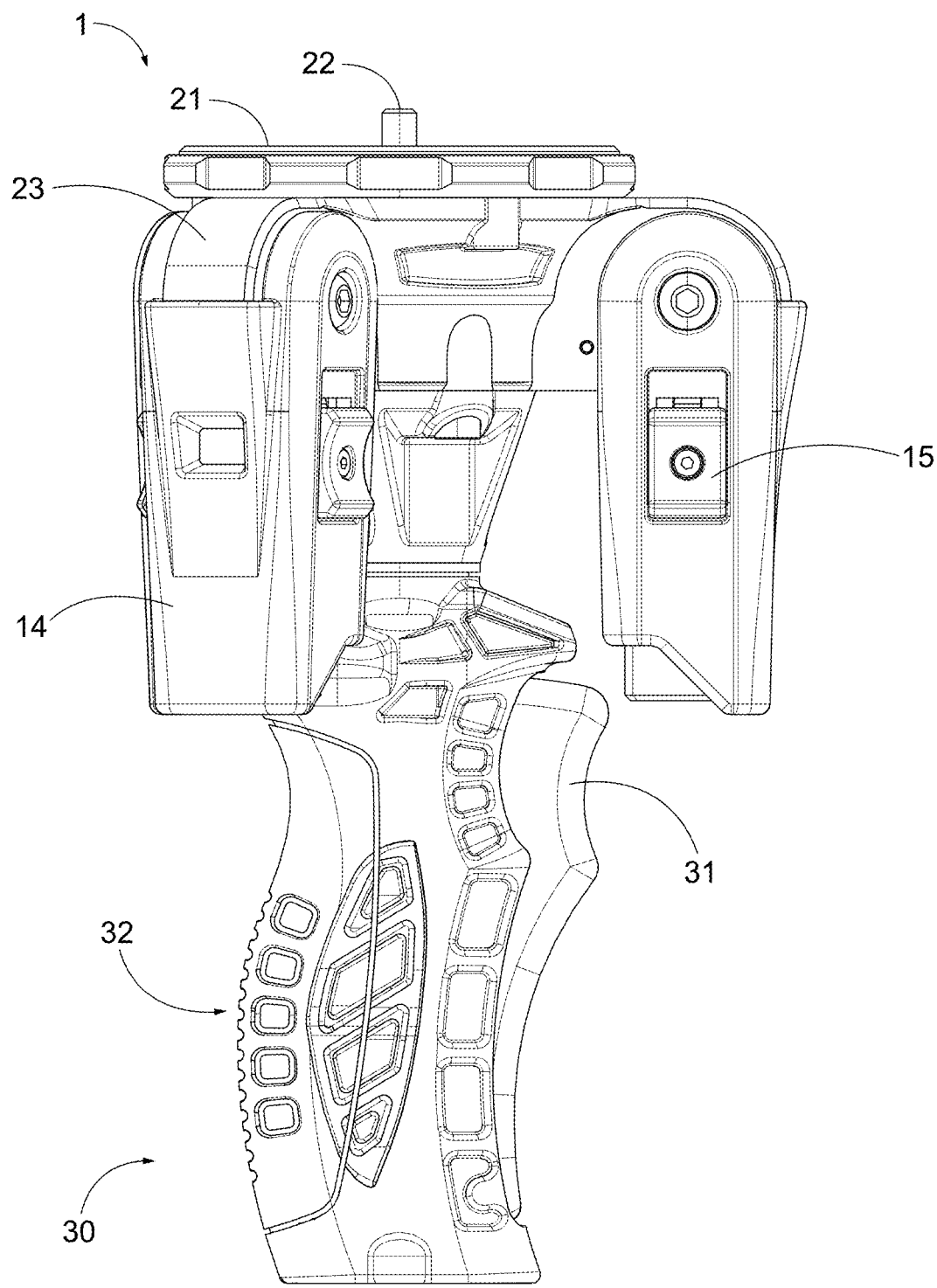
Figure 25:
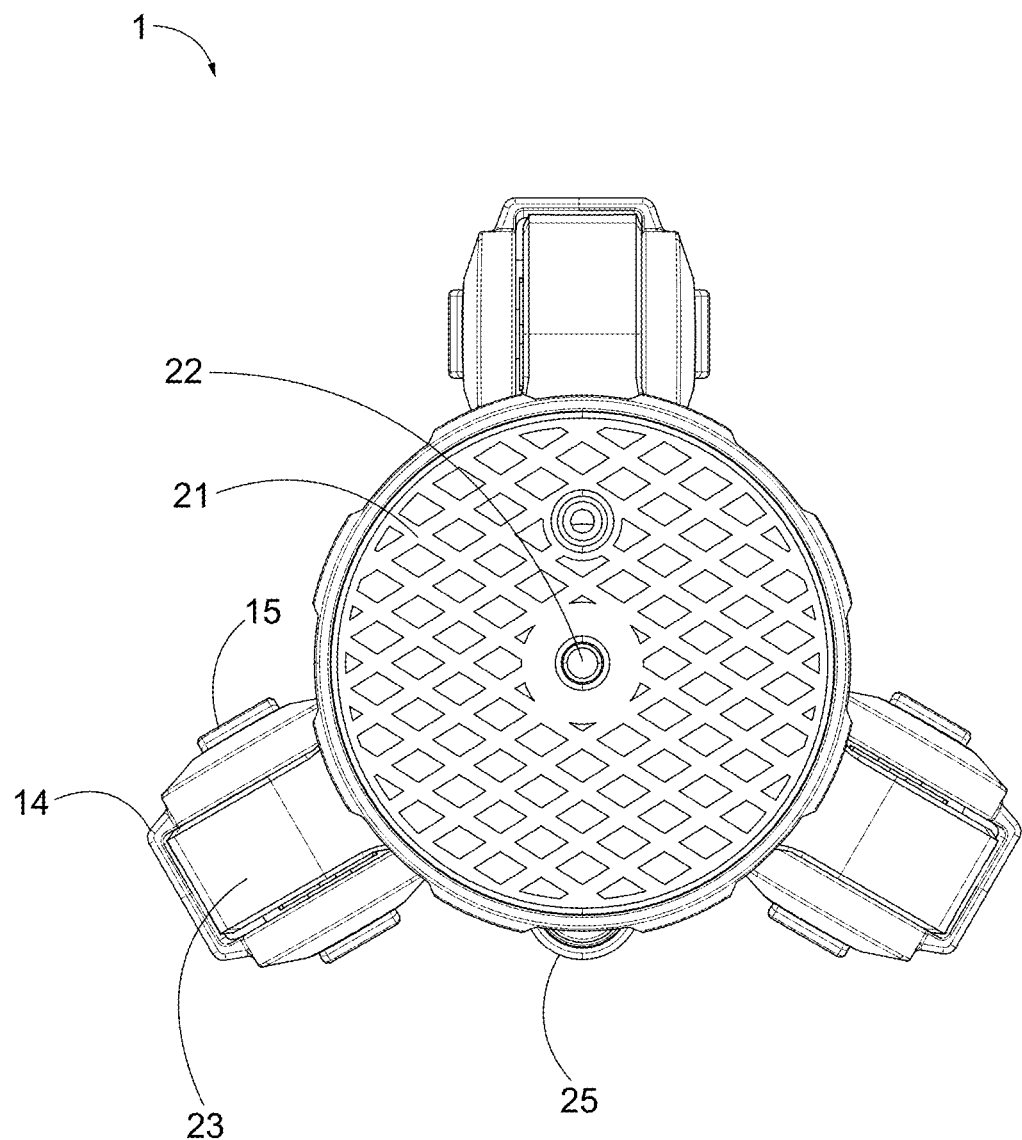
Figure 26:
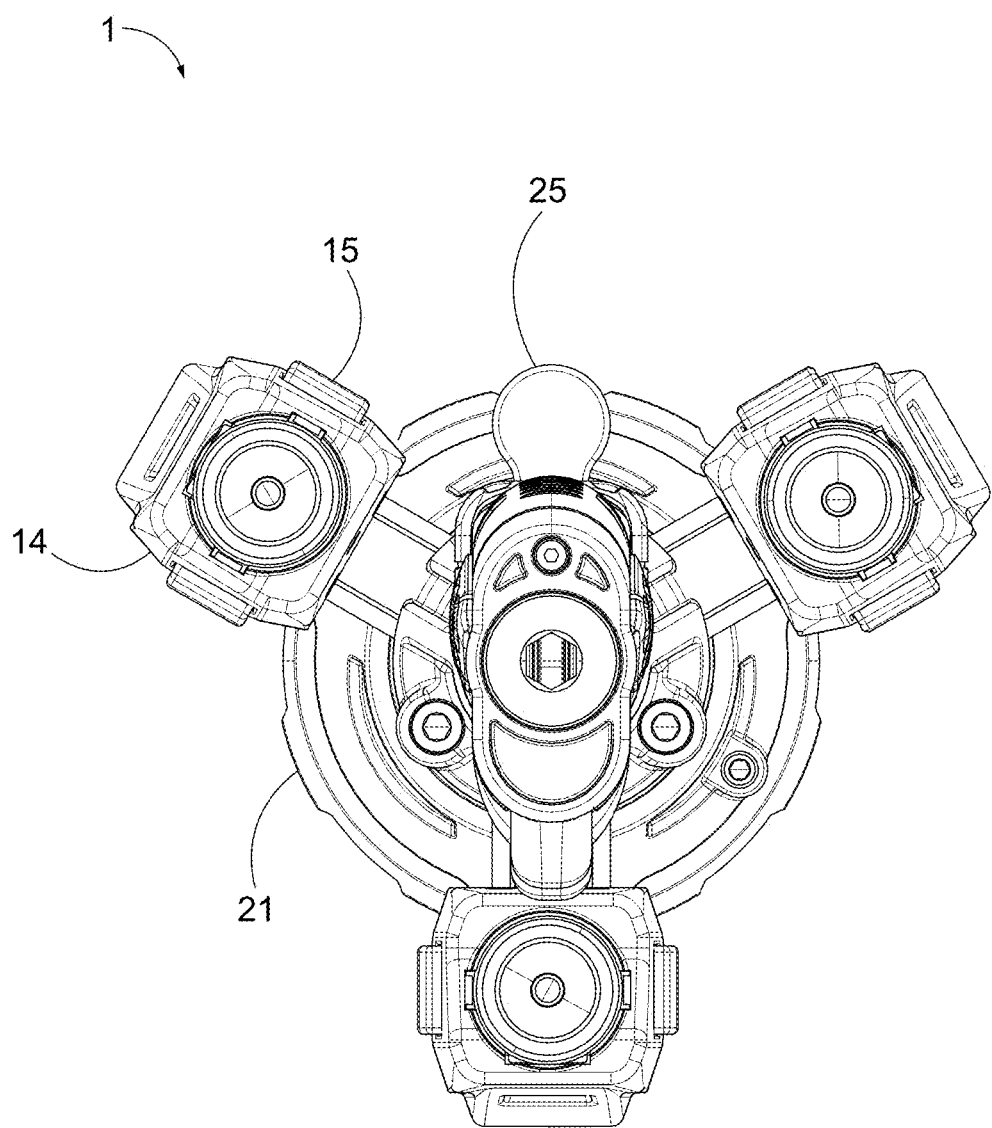

FIG. 10 shows a camera 52 mounted on the platform 22 of the stand using a mount 80. Mount 80 may be configured to rotate about a vertical axis to allow the camera 52 to pan horizontally. Optionally, mount 80 may also be configured to pivot the camera up and down. In some embodiments, mount 80 may also be configured to tilt the camera 90 degrees to change the image aspect from landscape to portrait.

FIGS. 11-18 show various views of a telescoping support stand with legs disposed in an open stance according to an embodiment of the disclosed subject matter. FIGS. 19-26 show various views of a telescoping support stand with legs disposed in a closed stance according to an embodiment of the disclosed subject matter. In these views, the tubular members of the legs are not shown connected to end fittings 14 for ease of presentation of the connection housing and handle assembly. In these views optional trigger lock is absent.

Figure 27:
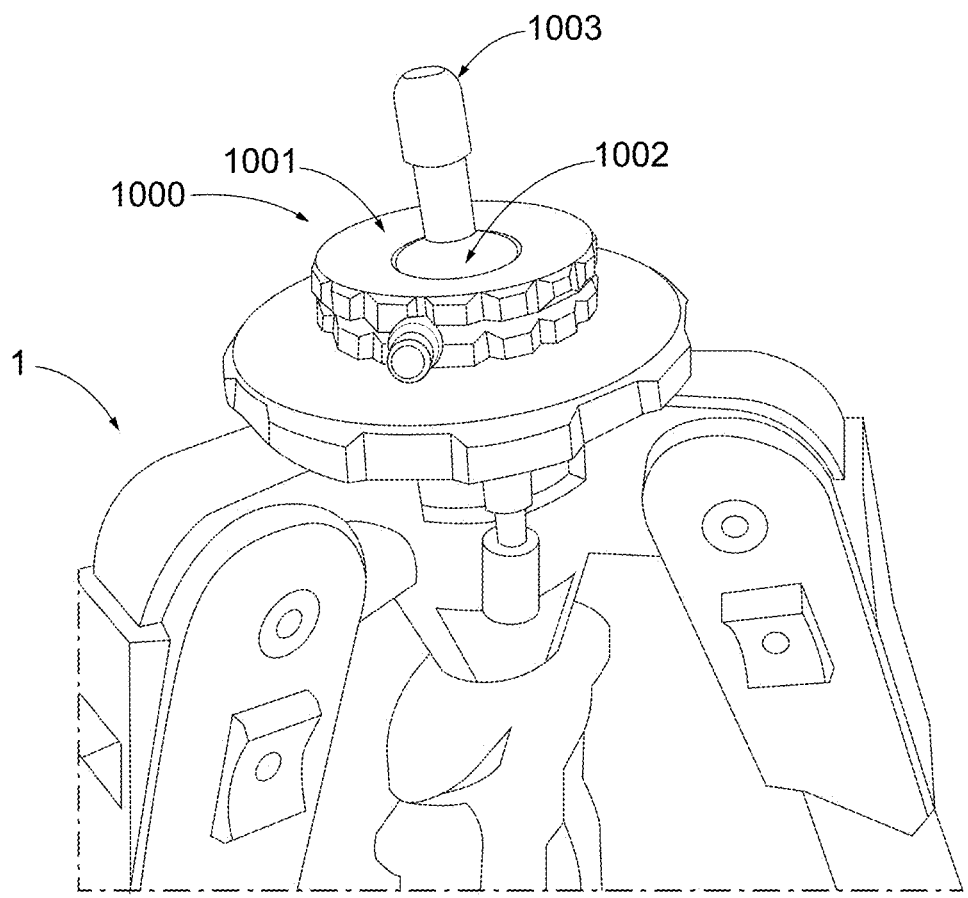
FIG. 27 shows another accessory mount configured to attach to the telescoping support stand comprising an accessory mounting assembly housing having an internal socket and a ball joint comprising a ball housed within the internal socket, in accordance with embodiments of the disclosure.

FIG. 27 shows another accessory mount 1000 configured to attach to the telescoping support stand, comprising an accessory mounting assembly housing 1001 having an internal socket and a ball joint comprising a ball 1002 housed within the internal socket, in accordance with embodiments of the disclosure. A post 1003 connected to the ball 1002 is configured to attach to an accessory.

EMBODIMENTS

A first aspect provides a telescoping support stand comprising: a handle comprising a trigger disposed within the handle, wherein the handle is attached to a bottom end of a connection housing, when the telescoping support stand is in normal use; the connection housing comprises a release assembly within the connection housing configured to be actuated by the trigger; a plurality of extendable legs pivotably engaged near the top of the connection housing, each extendable leg comprising an outer tube; an inner tube having a first end portion that telescopically slides within the outer tube and a second end portion and a second end pivotably connected to the connection housing; a locking mechanism mounted to the first end portion of inner tube; wherein actuation of the trigger actuates the release mechanism to release the locking mechanism within each of the plurality of extendable legs to allow the inner tube and the outer tube to move longitudinally relative to each other when the release assembly is activated.

Embodiments of the stand include the following, alone or in any combination.

When the trigger is in a first position, the release assembly in communication with the locking mechanism prevents longitudinal movement of inner tube and outer tube relative to each other.

When the trigger is in a second position, the release assembly in communication with the locking mechanism allows longitudinal movement of inner tube and outer tube relative to each other.

The connection housing comprises a plurality of pivot hubs engaged to the plurality of extendable legs.

The trigger is accessible outside the handle assembly.

The trigger includes first and second ends, the first end being pivotally attached to the handle assembly and the second end being movable radially inward and radially outward during operation.

The release lever pivots about an axis arranged perpendicular to a length dimension of the first and second tubes.

The release assembly comprises a displacement rod extending from the connection housing into the handle in operational connectivity to the trigger and the release member in the connection housing; wherein the release member is in operational connectivity to a plurality of release levers within the plurality of pivot hubs in the connection housing; the plurality of release levers are in operational connectivity with a plurality of release rods, and each of the plurality of release rods is in operational connectivity to a respective locking mechanism within each of the extendable legs.

Each release lever is pivotable about a pivot and comprises at least one convex surface arranged to interface with a respective release rod.

The trigger comprises a curved portion at its upper end engaged to a wheel disposed to the bottom end of the displacement rod is configured to move displacement rod upward when the trigger is moved radially inward toward the handle.

The trigger is biased into a first or rest position extending radially outward from the handle assembly, the release assembly in communication with the locking mechanism prevents longitudinal movement of inner tube and outer tube relative to each other.

When the trigger is in the rest position, the displacement rod and the displacement member are disposed in upward positions, and the plurality of release levers are configured to dispose the release rods in upward positions.

When the trigger is in a second or release position extending radially inward toward the handle assembly, the release assembly in communication with the locking mechanism allows longitudinal movement of inner tube and outer tube relative to each other.

When the trigger is in the release position, the displacement rod and the displacement member are disposed in upward positions, and the plurality of release levers are configured to dispose the release rods in upward positions.

The locking mechanism comprises a plunger operationally connected to each release rod, a collar attached to the bottom of the inner tube and slidably engaged around the plunger; a helical spring disposed around the plunger and engaged at its upper end to the upper end of the plunger and its lower end engaged to the collar, a truncated cone member disposed around the plunger; a bearing retainer comprising a plurality of bearings circumferentially disposed around the bearing retainer; wherein the conical surface of the truncated cone member is configured to contact the plurality of bearings.

The locking mechanism is configured to move between a first position preventing the inner tube and the outer tube from moving relative to each other and a second position wherein the inner tube and the outer tube are allowed to move relative to each other.

In the first position, the trigger is disposed radially outward from the handle assembly, the conical surface of the truncated cone member is in contact with the plurality of bearings, pressing them against an inner surface of the outer tube and preventing the inner tube and the outer tube from moving relative to each other.

In the second position, the trigger is disposed radially inward toward the handle assembly, the conical surface of the truncated cone member allows the bearings to move out of contact with the inner surface, allowing the inner tube and the outer tube to move relative to each other.

Movement of the release rod downward moves the locking mechanism into the second position when a user moves the trigger radially inward toward the housing assembly; and when the user releases the trigger, the locking mechanism is returned to the first position.

The handle further comprises a trigger lock configured to prevent and/or allow movement of the trigger with respect to the handle.

Each extendable leg is independently pivotably adjustable with respect to the handle, connection housing or with respect to each other.

Each extendable leg comprises a pivot lock configured to engage one or more detents in the connection housing to independently define the amount of pivotable adjustment with respect to the handle, connection housing or with respect to each other.

Each leg further comprises an open end cap disposed on a first end of the outer tube around the second tube comprising an extension lock configured to prevent and/or allow longitudinal movement of the inner tube within the outer tube.

Each leg further comprises a third or outermost tube comprising an open end cap disposed on a first end of the third tube around the outer tube comprising an extension lock configured to prevent and/or allow longitudinal movement of the outer tube within the third tube.

The third tube is longitudinally extendable from the outer tube manually by a user.

The telescoping support stand comprises two extendable legs.

The telescoping support stand comprises three extendable legs.

The upper end of the connection housing is configured to engage an accessory or an accessory mounting assembly.

The upper end of the connection housing comprises an accessory platform and an accessory post.

The telescoping support stand comprises an accessory mounting assembly disposed on the accessory platform to mount to an accessory.

The telescoping support stand comprises an accessory or accessory attachment member comprising a weapon mount, gun rest, gun mount, microphone clip, camera mount, telescope mount, projectile weapon, gun, rifle, crossbow, compressed-air gun, or other type of firearm or gun, camera, camcorder, laser rangefinder, professional photography equipment, telescope, or surveyors' equipment.

The accessory attachment member comprises a clamp comprising a first wall and rectangular platform perpendicular to the first wall, a second wall opposed to the first wall and a flange perpendicular to the second wall configured to slidingly engage a slot in the rectangular platform and a clamping mechanism to move the second wall toward the first wall and engage a gunstock therebetween.

The accessory attachment member further comprises an accessory mounting assembly housing having an internal socket and a ball joint comprising a ball housed within the internal socket.

The ball comprises a ball joint bore extending through the ball and a helical spring is disposed within the ball joint bore.

The accessory mounting assembly comprises a ball joint rod disposed within the helical spring within the ball joint bore, wherein the ball joint rod is configured for biased movement relative to the ball joint bore.

The ball joint rod has a bottom end which is fixed to the accessory post.

The ball joint rod has an upper end having a diameter greater than a diameter of the ball joint bore, wherein the second end of the ball joint rod is configured to be blocked from passing through the ball joint bore.

The accessory mounting assembly housing comprises a curved T-shaped slot extending along two sides of the weapon mounting assembly housing, wherein the curved T-shaped slot comprises cross legs and a center leg; wherein the cross legs of the T-shaped slot extends across a bottom of the accessory mounting assembly housing and the center leg of the T-shaped slot extends along a side of the accessory mounting assembly housing.

Pulling up on the accessory mounting assembly relative to the connection housing by a user compresses the helical spring within the ball joint bore allowing movement of the accessory mounting assembly by rotating about the axis of the ball joint rod, wherein the ball joint rod is configured to follow the path of the T-shaped slot.

The accessory attachment member comprises an accessory mounting assembly housing having an internal socket and a ball joint comprising a ball housed within the internal socket.

The ball comprises a ball joint bore extending through the ball and a helical spring is disposed within the ball joint bore.

The accessory mounting assembly comprises a ball joint rod disposed within the helical spring within the ball joint bore, wherein the ball joint rod is configured for biased movement relative to the ball joint bore.

The ball joint rod has a bottom end which is fixed to the accessory post.

The ball joint rod has an upper end having a diameter greater than a diameter of the ball joint bore, wherein the second end of the ball joint rod is configured to be blocked from passing through the ball joint bore.

The accessory mounting assembly housing comprises a curved T-shaped slot extending along two sides of the weapon mounting assembly housing, wherein the curved T-shaped slot comprises cross legs and a center leg; wherein the cross legs of the T-shaped slot extends across a bottom of the accessory mounting assembly housing and the center leg of the T-shaped slot extends along a side of the accessory mounting assembly housing.

Pulling up on the accessory mounting assembly relative to the connection assembly by a user compresses the helical spring within the ball joint bore allowing movement of the accessory mounting assembly by rotating about the axis of the ball joint rod, wherein the ball joint rod is configured to follow the path of the T-shaped slot.

The accessory mounting assembly comprises a weapon mount configured to mount a weapon, wherein the weapon mount is configured to be mounted to at least one of a swivel stud or a rail attached to the weapon, wherein the weapon mount comprises a fixed rail and a movable rail which is configured to be movable toward and away from the fixed rail in order to clamp onto the rail attached to the weapon, wherein a locking lever is pivotally attached to the moveable rail configured to lock the movable rail relative to the fixed rail by a pivot connection.

The accessory mounting assembly comprises a weapon mount configured to mount a weapon, wherein the accessory mounting assembly further comprises a rail adapter, wherein the weapon mount comprises a fixed rail and a movable rail which is configured to be movable toward and away from fixed rail in order to clamp onto the rail adapter, wherein the rail adapter is mounted to the fixed rail and the movable rail by a locking nut, wherein the rail adapter has a V-shaped or U-shaped cross section and has a through hole for mounting to a swivel stud on the gun with the locking nut.

The accessory attachment member comprises a clamp comprising a first wall and rectangular platform perpendicular to the first wall, a second wall opposed to the first wall and a flange perpendicular to the second wall configured to slidingly engage a slot in the rectangular platform and a clamping mechanism to move the second wall toward the first wall and engage a gunstock therebetween.

The accessory attachment member further comprises an accessory mounting assembly housing having an internal socket and a ball joint comprising a ball housed within the internal socket.

The ball comprises a ball joint bore extending through the ball and a helical spring is disposed within the ball joint bore.

The accessory mounting assembly comprises a ball joint rod disposed within the helical spring within the ball joint bore, wherein the ball joint rod is configured for biased movement relative to the ball joint bore.

The ball joint rod has a bottom end which is fixed to the accessory post.

The ball joint rod has an upper end having a diameter greater than a diameter of the ball joint bore, wherein the second end of the ball joint rod is configured to be blocked from passing through the ball joint bore.

The accessory mounting assembly housing comprises a curved T-shaped slot extending along two sides of the weapon mounting assembly housing, wherein the curved T-shaped slot comprises cross legs and a center leg; wherein the cross legs of the T-shaped slot extends across a bottom of the accessory mounting assembly housing and the center leg of the T-shaped slot extends along a side of the accessory mounting assembly housing.

Pulling up on the accessory mounting assembly relative to the connection housing by a user compresses the helical spring within the ball joint bore allowing movement of the accessory mounting assembly by rotating about the axis of the ball joint rod, wherein the ball joint rod is configured to follow the path of the T-shaped slot.

The accessory attachment comprises a gun rest comprising a platform with a valley defined by a generally Y-shaped cross-section of the platform, and a mounting ring 73 on the bottom of the rest 71 is configured to engage the accessory post 22 of the connection housing 20 wherein the weapon may rest within the upper arms of the Y-shaped platform.

The accessory attachment member comprises an accessory mounting assembly for mounting a camera.

A second aspect provides a telescoping support stand comprising: a handle comprising a trigger disposed within the handle, wherein the handle is attached to a bottom end of a connection housing, when the telescoping support stand is in normal use; wherein the trigger is accessible outside the handle assembly includes first and second ends, the first end being pivotally attached to the handle assembly and the second end being movable radially inward and radially outward during operation; a plurality of extendable legs pivotably engaged near the top of the connection housing, each extendable leg comprising an outer tube; an inner tube having a first end portion that telescopically slides within the outer tube and a second end portion and a second end pivotably connected to the connection housing; and a locking mechanism mounted to the first end portion of inner tube; the connection housing comprising a plurality of pivot hubs and a release assembly within the connection housing configured to be actuated by the trigger; wherein the release assembly comprises a displacement rod extending from the connection housing into the handle in operational connectivity to the trigger and the release member in the connection housing; the release member is in operational connectivity to a plurality of release levers within the plurality of pivot hubs in the connection housing; and the plurality of release levers are in operational connectivity with a plurality of release rods; and each of the plurality of release rods is in operational connectivity to a respective locking mechanism within each of the extendable legs; and each locking mechanism comprises a plunger operationally connected to each release rod, a collar attached to the bottom of the inner tube and slidably engaged around the plunger; a helical spring disposed around the plunger and engaged at its upper end to the upper end of the plunger and its lower end engaged to the collar, a truncated cone member disposed around the plunger; a bearing retainer comprising a plurality of bearings circumferentially disposed around the bearing retainer; wherein the conical surface of the truncated cone member is configured to contact the plurality of bearings; wherein the locking mechanism is configured to move between a first position preventing the inner tube and the outer tube from moving relative to each other and a second position wherein the inner tube and the outer tube are allowed to move relative to each other; wherein actuation of the trigger actuates the release mechanism to release the locking mechanism within each of the plurality of extendable legs to allow the inner tube and the outer tube to move longitudinally relative to each other when the release assembly is activated.

Embodiments of this telescoping stand include the following and any of the embodiments listed above for the previous stand, alone or in any combination.

In the first position, the trigger is disposed radially outward from the handle assembly, and the conical surface of the truncated cone member is in contact with the plurality of bearings, pressing them against an inner surface of the outer tube and preventing the inner tube and the outer tube from moving relative to each other.

In the second position, the trigger is disposed radially inward toward the handle assembly, the conical surface of the truncated cone member allows the bearings to move out of contact with the inner surface, allowing the inner tube and the outer tube to move relative to each other.

Each leg further comprises a third or outermost tube comprising an open end cap disposed on a first end of the third tube around the outer tube comprising an extension lock configured to prevent and/or allow longitudinal movement of the outer tube within the third tube.

The third tube is longitudinally extendable from the outer tube manually by a user.

The telescoping support stand comprises three extendable legs.

A third aspect provides an accessory attachment member configured to engage the connection housing of the telescoping support stands described above, comprising a clamp comprising a first wall and rectangular platform perpendicular to the first wall, a second wall opposed to the first wall and a flange perpendicular to the second wall configured to slidingly engage a slot in the rectangular platform and a clamping mechanism to move the second wall toward the first wall and engage a gunstock therebetween.

Embodiments of the accessory attachment member include the following alone or in any combination.

The accessory attachment member further comprises an accessory mounting assembly housing having an internal socket and a ball joint comprising a ball housed within the internal socket.

The ball comprises a ball joint bore extending through the ball and a helical spring is disposed within the ball joint bore.

The accessory mounting assembly comprises a ball joint rod disposed within the helical spring within the ball joint bore, wherein the ball joint rod is configured for biased movement relative to the ball joint bore.

The ball joint rod has a bottom end which is fixed to the accessory post.

The ball joint rod has an upper end having a diameter greater than a diameter of the ball joint bore, wherein the second end of the ball joint rod is configured to be blocked from passing through the ball joint bore.

The accessory mounting assembly housing comprises a curved T-shaped slot extending along two sides of the weapon mounting assembly housing, wherein the curved T-shaped slot comprises cross legs and a center leg; wherein the cross legs of the T-shaped slot extends across a bottom of the accessory mounting assembly housing and the center leg of the T-shaped slot extends along a side of the accessory mounting assembly housing.

Pulling up on the accessory mounting assembly relative to the connection housing by a user compresses the helical spring within the ball joint bore allowing movement of the accessory mounting assembly by rotating about the axis of the ball joint rod, wherein the ball joint rod is configured to follow the path of the T-shaped slot.

Many alternatives, modifications, and variations are enabled by the present disclosure. While specific embodiments have been shown and described in detail to illustrate the application of the principles of the invention, it will be understood that the exemplary embodiments may be embodied otherwise without departing from such principles. Accordingly, Applicants intend to embrace all such alternatives, modifications, equivalents, and variations that are within the spirit and scope of the exemplary embodiments.

The invention claimed is:

1. A telescoping support stand comprising:
a handle comprising a trigger disposed within the handle, wherein the handle is attached to a bottom end of a connection housing, when the telescoping support stand is in use;
the connection housing comprises a plurality of pivot hubs above the handle and a release assembly within the connection housing configured to be actuated by the trigger;
a respective extendable leg pivotably engaged to each pivot hub of the plurality of pivot hubs, each extendable leg comprising
an outer tube;
an inner tube having a first end portion that telescopically slides within the outer tube and a second end portion pivotably engaged to each respective pivot hub of the plurality of pivot hubs; and
a locking mechanism mounted to the first end portion of the inner tube;
wherein actuation of the trigger actuates the release assembly to release the locking mechanism within each extendable leg to allow the inner tube and the outer tube to move longitudinally relative to each other when the release assembly is activated; wherein when the trigger is in a first position, the release assembly in communication with the locking mechanism prevents longitudinal movement of the inner tube and the outer tube relative to each other; and when the trigger is in a second position, the release assembly in communication with the locking mechanism allows longitudinal movement of the inner tube and the outer tube relative to each other;
wherein the release assembly comprises
a displacement rod extending from the connection housing into the handle in operational connectivity to the trigger and a release member in the connection housing; wherein the release member is in operational connectivity to a respective release lever within each pivot hub;
each release lever is pivotable about a pivot and is in operational connectivity with a respective release rod within each extendable leg in operational connectivity to the locking mechanism within each extendable leg; and an upper end of the trigger comprises a curved portion engaged to a wheel disposed at a bottom end of the displacement rod configured to move the displacement rod upward when the trigger is moved radially inward toward the handle.

2. The telescoping support stand of claim 1 wherein each locking mechanism comprises
a plunger operationally connected to the respective release rod;
a collar comprising a truncated cone member attached to the first end of the inner tube and slidably engaged around the plunger;
a helical spring disposed around the plunger with an upper end engaged to an upper end of the plunger and a lower end engaged to the collar;
a bearing retainer comprising a plurality of bearings circumferentially disposed around the bearing retainer; wherein a conical surface of the truncated cone member is configured to contact the plurality of bearings;
wherein the locking mechanism is configured to move between a first position preventing the inner tube and the outer tube from moving relative to each other and a second position wherein the inner tube and the outer tube are allowed to move relative to each other.

3. The telescoping support stand of claim 2 wherein in the first position, the trigger is disposed radially outward from the handle, the conical surface of the truncated cone member is in contact with the plurality of bearings, pressing them against an inner surface of the outer tube and preventing the inner tube and the outer tube from moving relative to each other; and in the second position, the trigger is disposed radially inward toward the handle, the conical surface of the truncated cone member allows the bearings to move out of contact with the inner surface, allowing the inner tube and the outer tube to move relative to each other.

4. The telescoping support stand of claim 1, wherein each extendable leg comprises a pivot lock configured to engage one or more detents in the connection housing to independently define the amount of pivotable adjustment with respect to the handle, connection housing or with respect to each other.

5. The telescoping support stand of claim 1, wherein each extendable leg further comprises an open end cap disposed on a first end of the outer tube around the inner tube comprising an extension lock configured for a user to selectively prevent or allow longitudinal movement of the inner tube within the outer tube.

6. The telescoping support stand of claim 1, wherein each leg further comprises a third or outermost tube comprising an open end cap disposed on a first end of the third tube around the outer tube comprising an extension lock configured for a user to selectively prevent or allow longitudinal movement of the outer tube within the third tube; wherein the third tube is longitudinally extendable from the outer tube manually by the user.

7. The telescoping support stand of claim 1 having three extendable legs.

8. The telescoping support stand of claim 1 wherein thean upper end of the connection housing is configured to engage an accessory or an accessory mounting assembly.

9. The telescoping support stand of claim 8 wherein the upper end of the connection housing comprises an accessory platform and an accessory post.

10. The telescoping support stand of claim 9 comprising an accessory mounting assembly disposed on the accessory platform to mount to an accessory.

11. The telescoping support stand of claim 10 wherein the accessory mounting assembly comprises a housing having an internal socket and a ball joint comprising a ball housed within the internal socket.

12. A telescoping support stand comprising:
a handle comprising a trigger disposed within the handle, wherein the handle is attached to a bottom end of a connection housing, when the telescoping support stand is in use; wherein the trigger is accessible outside the handle and includes first and second ends, the first end being pivotally attached to the handle and the second end being movable radially inward and radially outward during operation;
the connection housing comprising a plurality of pivot hubs above the handle and a release assembly within the connection housing configured to be actuated by the trigger;
a respective extendable leg pivotably engaged to each pivot hub of the plurality of pivot hubs, each extendable leg comprising
an outer tube;
an inner tube having a first end portion that telescopically slides within the outer tube and a second end portion pivotably engaged to each respective pivot hub of the plurality of pivot hubs; and
a locking mechanism mounted to the first end portion of inner tube;
wherein the release assembly comprises a displacement rod extending from the connection housing into the handle in operational connectivity to the trigger and a release member in the connection housing; the release member is in operational connectivity to a respective release lever within each of the plurality of pivot hubs; and
each release lever is in operational connectivity with a respective release rod in operational connectivity to the locking mechanism within each of the extendable legs; and each locking mechanism comprises
a plunger operationally connected to the respective release rod;
a collar comprising a truncated cone member attached to the first end of the inner tube and slidably engaged around the plunger;
a helical spring disposed around the plunger with an upper end engaged to an upper end of the plunger and a lower end engaged to the collar;
a bearing retainer comprising a plurality of bearings circumferentially disposed around the bearing retainer; wherein a conical surface of the truncated cone member is configured to contact the plurality of bearings;
wherein the locking mechanism is configured to move between a first position preventing the inner tube and the outer tube from moving relative to each other and a second position wherein the inner tube and the outer tube are allowed to move relative to each other;
wherein actuation of the trigger actuates the release mechanism to release the locking mechanism within each of the extendable legs to allow the inner tube and the outer tube of each leg to move longitudinally relative to each other when the release assembly is activated.

13. The telescoping support stand of claim 12 wherein in the first position, the trigger is disposed radially outward from the handle, and the conical surface of each truncated cone member is in contact with the respective plurality of bearings, pressing them against an inner surface of the respective outer tube and preventing the inner tube and the outer tube of each leg from moving relative to each other.

14. The telescoping support stand of claim 12 wherein in the second position, the trigger is disposed radially inward toward the handle, the conical surface of each truncated cone member allows the respective bearings to move out of contact with the respective inner surface, allowing the inner tube and the outer tube of each leg to move relative to each other.

15. The telescoping support stand of claim 12, wherein each extendable leg comprises a pivot lock configured to engage one or more detents in the connection housing to independently define the amount of pivotable adjustment with respect to the handle, connection housing or with respect to each other.

16. The telescoping support stand of claim 12, wherein each leg further comprises a third or outermost tube comprising an open end cap disposed on a first end of the third tube around the outer tube comprising an extension lock configured for a user to selectively prevent or allow longitudinal movement of the outer tube within the third tube;
wherein the third tube is longitudinally extendable from the outer tube manually by the user.

17. The telescoping support stand of claim 12 having three extendable legs.

18. The telescoping support stand of claim 12 wherein an upper end of the connection housing is configured to engage an accessory or an accessory mounting assembly.

19. The telescoping support stand of claim 18 wherein the accessory mounting assembly comprises a housing having an internal socket and a ball joint comprising a ball housed within the internal socket engaged to the connection housing.

* * * * *